INVENTORS
ALVIN P. MULLERY
GRAHAM C. DRISCOLL, JR.
BY Isidore Match
ATTORNEY

T CLOCK

ENTER TASK CLOCK

T CLOCK

FIG. 12 ENTER TASK

REQUEST TASK

FIG. 14A

DIL GOES FROM 0-7 AND REPEATS

| | | INTERRUPT CTR | EXECUTE CTR | UNFILLED CTR | IN CTR | FILLED FF | UPE FF | CONTENTS OF DIL REGISTERS 0 | 1 | 2 | 3 | 4 | 5 | 6 | 7 |
|---|---|---|---|---|---|---|---|---|---|---|---|---|---|---|---|
| | INITIAL | 0 | 4 | 4 | 4 | 0 | 0 | 0 | 0 | 0 | 0 | 0 | 0 | 0 | 0 |
| 1 | T | 1 | 5 | 5 | 5 | 0 | 0 | 0 | 0 | 0 | 0 | 0 | 0 | 0 | 0 |
| 2 | ET | 1 | 5 | 5 | 5 | 0 | 0 | 0 | 0 | 0 | 0 | 0 | 1 | 0 | 0 |
| 3 | ET | 1 | 5 | 4 | 5 | 0 | 1 | 0 | 0 | 0 | 0 | 0 | 2 | 0 | 0 |
| 4 | RT | 1 | 5 | 5 | 5 | 0 | 0 | 0 | 0 | 0 | 0 | 0 | 1 | 0 | 0 |
| 5 | ET | 1 | 5 | 4 | 5 | 0 | 1 | 0 | 0 | 0 | 0 | 0 | 2 | 0 | 0 |
| 6 | RT | 1 | 5 | 5 | 5 | 0 | 0 | 0 | 0 | 0 | 0 | 0 | 1 | 0 | 0 |
| 7 | ET | 1 | 5 | 4 | 5 | 0 | 1 | 0 | 0 | 0 | 0 | 0 | 2 | 0 | 0 |
| 8 | ET | 1 | 4 | 4 | 5 | 0 | 0 | 0 | 0 | 0 | 0 | 1 | 2 | 0 | 0 |
| 9 | ET | 1 | 4 | 3 | 5 | 0 | 1 | 0 | 0 | 0 | 0 | 2 | 2 | 0 | 0 |
| 10 | ET | 1 | 3 | 3 | 5 | 0 | 0 | 0 | 0 | 0 | 1 | 2 | 2 | 0 | 0 |
| 11 | ET | 1 | 3 | 2 | 5 | 0 | 1 | 0 | 0 | 0 | 2 | 2 | 2 | 0 | 0 |
| 12 | ET | 1 | 2 | 2 | 5 | 0 | 0 | 0 | 0 | 1 | 2 | 2 | 2 | 0 | 0 |
| 13 | ET | 1 | 2 | 1 | 5 | 1 | 1 | 0 | 0 | 2 | 2 | 2 | 2 | 0 | 0 |
| 14 | RT | 1 | 2 | 2 | 5 | 0 | 0 | 0 | 0 | 1 | 2 | 2 | 2 | 0 | 0 |
| 15 | RT | 1 | 3 | 2 | 5 | 0 | 1 | 0 | 0 | 0 | 2 | 2 | 2 | 0 | 0 |

MAX. LIMIT = 2

FIG. 14

| FIG. 14A |
|---|
| FIG. 14B |

FIG. 14B

DIL GOES FROM 0-7 AND REPEATS

MAX. LIMIT = 1

| | | | | | | | | | | | | | | | |
|---|---|---|---|---|---|---|---|---|---|---|---|---|---|---|---|
| 16 | RT | 1 | 3 | 3 | 5 | 0 | 0 | 0 | 0 | 0 | 1 | 2 | 2 | 0 | 0 |
| 17 | RT | 1 | 4 | 3 | 5 | 0 | 1 | 0 | 0 | 0 | 0 | 2 | 2 | 0 | 0 |
| 18 | RT | 1 | 4 | 4 | 5 | 0 | 0 | 0 | 0 | 0 | 0 | 1 | 2 | 0 | 0 |
| 19 | RT | 1 | 5 | 4 | 5 | 0 | 1 | 0 | 0 | 0 | 0 | 0 | 2 | 0 | 0 |
| 20 | RT | 1 | 5 | 5 | 5 | 0 | 0 | 0 | 0 | 0 | 0 | 0 | 1 | 0 | 0 |
| 21 | RT | 1 | 5 | 5 | 5 | 0 | 0 | 0 | 0 | 0 | 0 | 0 | 0 | 0 | 0 |
| 22 | ET | 1 | 5 | 4 | 5 | 0 | 1 | 0 | 0 | 0 | 0 | 0 | 1 | 0 | 0 |
| 23 | ET | 1 | 4 | 3 | 5 | 0 | 1 | 0 | 0 | 0 | 0 | 1 | 1 | 0 | 0 |
| 24 | ET | 1 | 3 | 2 | 5 | 0 | 1 | 0 | 0 | 0 | 1 | 1 | 1 | 0 | 0 |
| 25 | ET | 1 | 2 | 1 | 5 | 1 | 1 | 0 | 0 | 1 | 1 | 1 | 1 | 0 | 0 |
| 26 | RT | 1 | 3 | 2 | 5 | 0 | 1 | 0 | 0 | 0 | 1 | 1 | 1 | 0 | 0 |
| 27 | RT | 1 | 4 | 3 | 5 | 0 | 1 | 0 | 0 | 0 | 0 | 1 | 1 | 0 | 0 |
| 28 | RT | 1 | 5 | 4 | 5 | 0 | 1 | 0 | 0 | 0 | 0 | 0 | 1 | 0 | 0 |
| 29 | RT | 1 | 5 | 5 | 5 | 0 | 0 | 0 | 0 | 0 | 0 | 0 | 0 | 0 | 0 |
| 30 | T | 2 | 6 | 6 | 6 | 0 | 0 | 0 | 0 | 0 | 0 | 0 | 0 | 0 | 0 |
| 31 | T | 3 | 7 | 7 | 7 | 0 | 0 | 0 | 0 | 0 | 0 | 0 | 0 | 0 | 0 |
| 32 | T | 4 | 0 | 0 | 0 | 0 | 0 | 0 | 0 | 0 | 0 | 0 | 0 | 0 | 0 |
| 33 | T | 5 | 1 | 1 | 1 | 0 | 0 | 0 | 0 | 0 | 0 | 0 | 0 | 0 | 0 |
| 34 | ET | 5 | 1 | 0 | 1 | 0 | 1 | 0 | 1 | 0 | 0 | 0 | 0 | 0 | 0 |
| 35 | ET | 5 | 0 | 7 | 1 | 0 | 1 | 1 | 1 | 0 | 0 | 0 | 0 | 0 | 0 |
| 36 | ET | 5 | 7 | 6 | 1 | 0 | 1 | 1 | 1 | 0 | 0 | 0 | 0 | 0 | 1 |
| 37 | ET | 5 | 6 | 5 | 1 | 1 | 1 | 1 | 1 | 0 | 0 | 0 | 0 | 1 | 1 |

United States Patent Office 3,541,520
Patented Nov. 17, 1970

3,541,520
TIME-SHARING ARRANGEMENT

Alvin P. Mullery, Chappaqua, and Graham C. Driscoll, Jr., Yorktown Heights, N.Y., assignors to International Business Machines Corporation, Armonk, N.Y., a corporation of New York Filed Dec. 18, 1967, Ser. No. 691,534
Int. Cl. G06c *15/22*
U.S. Cl. 340—172.5 9 Claims

ABSTRACT OF THE DISCLOSURE

A time sharing arrangement for a multiprocessing system in which there is provided a time-sharing queue which consists of component tasks from jobs presented to the system for execution and placed on the queue in chronological order. A demand interrupt list is included which comprises a list of time slots. A first pointer, i.e., an "in" pointer is provided to indicate the current time slot in the list. A second pointer, i.e., an "interrupt" pointer is provided to indicate a slot in the list which is a chosen multiple of slots removed from the aforementioned current slot, such chosen multiple of time slots being a desired maximum period to effect the execution of a task from the time that it is entered in the time-sharing queue. A third pointer, i.e., an "execute" pointer, is included to indicate a slot in the list which is later than the one pointed to by the "interrupt" pointer but is otherwise the oldest slot which indicates tasks to be executed. A fourth pointer, i.e., an "unfilled" pointer, is provided to point to a slot in the list between the ones pointed to by the "in" and "interrupt" pointers that indicates a number of tasks to be executed which is less than the number of processors available to respectively execute the latter tasks.

BACKGROUND OF THE INVENTION

This invention relates to time-sharing arrangements in data processing systems. More particularly, it relates to novel apparatus which enables improved time-sharing efficiency in multiprocessing systems.

In time-sharing systems, it has been found that if processors become available to a user only when a task is completed, there results the undesirable condition that, at times, a user may be required to wait for processor availabilities inordinately long periods. In such situations, the response time between a terminal's requesting the execution of a given task and the initiation of the actual execution is dependent both upon how many tasks precede the given task in a queue and the total lengths of executions of these tasks.

To overcome the possibility of occurrence of undesirably long response times, presently known time-sharing systems generally employ a time-slicing or commutative technique. In such technique, each job is essentially broken up into a number of smaller portions. In other words, a piece of a first job is executed, then a piece of a second job is executed, etc., and the job queue is essentially cycled for portion execution. At some later time, the next piece of the first job is executed followed by the execution of the next piece of the second job, etc. With such technique, the total time required to execute a given job is relatively independent of the execution lengths of any of the other jobs.

It is readily appreciated that a time-slicing technique is inherently disadvantageously inefficient because of the time wasted in the storing and the restoring of the states of a processor at the end and the beginning of each executed slice of a task and in the performance of other housekeeping tasks pertinent thereto.

Accordingly, it is an important object of this invention to provide a time-sharing arrangement in a data processing system which substantially reduces the time expended therein for monitoring the states of the system in response to switching between jobs.

It is another object to provide a time-sharing arrangement in accordance with the preceding object which is relatively simple in structure and is advantageously adaptable for use in large systems such as parallel processing and multiple processing systems.

SUMMARY OF THE INVENTION

Generally speaking and in accordance with the invention, there is provided a time-sharing arrangement in a multiprocessing system comprising a given number of processing entities which comprises means for establishing a queue of a plurality of tasks for execution from different jobs presented to the system, the tasks being respectively chronologically entered into the queue. There are further included in the arrangement, means for establishing a list of a plurality of chronologically arranged time slots of respectively equal durations and pointer means associated with such list. The pointer means comprises a first pointer associated with the list for indicating a first and current time slot, a second pointer associated with the list for indicating a second time slot which precedes the first time slot by a chosen number of time slots, a third pointer associated with the list for indicating a third time slot which is the oldest time slot containing tasks which are to be executed, and a fourth pointer associated with the list for indicating a fourth time slot in the list between the first and third time slots which contains a number of tasks to be executed which is less than the given number of processing entities, the pointer means being operative to substantially effect the execution of the tasks during a period whose maximum duration is equal to the aforesaid chosen number of time slots.

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings:

FIGS. 14A and 14B, taken together as in FIG. 14, illustrates a sequence of cycles in the operation of the invention.

DESCRIPTION OF A PREFERRED EMBODIMENT

Figure 1A:
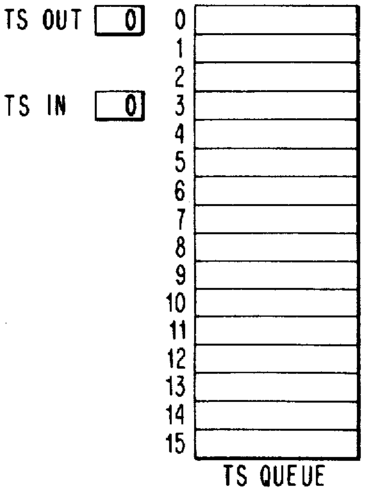
FIGS. 1A to 1C are respective schematic depictions of the respective initial conditions of the time-sharing queue, the demand interrupt list and the demand interrupt pointers constructed in accordance with the principles of the invention.

The inventive time-sharing arrangement disclosed herein produces the advantageous effect wherein, generally, each task is permitted to be completed and in which interruption or commutation occurs only when it is required to maintain a desirable response time for the system. Such task completion arrangement is particularly advantageous in large systems such as multi and parallel processing systems. In the latter type systems, a plurality of processors are available to process requests from terminals and, since these processors complete previous assignments at random time intervals, there is the strong probability that a processor will become spontaneously available, i.e., without interruption, within a preferred specified response time. Thus, in the aforementioned large systems, a time-sharing scheme is desirable wherein processor allocation requirements would interrupt processors only if the number of requests for service was such that the specified response time was being exceeded.

In addition, the time-sharing arrangement, according to the invention, enables a user to consider that the full power of a processing system upon which he is operating is available to him. Where it is employed in a parallel processing system, the user is able to write his job as a set of parallel tasks and can specify the parallel tasks as if he were dealing with the full parallel processing system.

In considering the structure of the time-sharing arrangement in accordance with the principles of the invention, each active job is provided with a task queue which determines the order in which the component tasks of a job are assigned to processors. The order in which tasks are assigned to processors from different task queues are determined by the employment of a time-sharing job queue, suitably designated the TS queue which is designed to be a first in, first out queue.

The TS queue is designed to consist of as many locations for a particular application as are sufficient to hold an address for every possible active job. For example, if a system comprises a given number of terminals, each terminal being able to activate a job at any time, then the number of locations in the task queue is at least equal to the aforesaid given number of terminals.

Two pointers are associated with the TS queue. The "TS out" pointer indicates the position in the queue which contains the currently first task. The "TS in" pointer indicates the position which contains the currently last task in the queue.

The TS queue is operative to effect the distribution of tasks for execution to the processors as the latter become available. To ensure that a maximum terminal waiting time, $w$, is not exceeded, there is provided means for controlling the availability of the processors. Such means, suitably termed "demand interrupt" is constructed in the form of a list. Each location in the list corresponds to a time interval, $m$, the latter notation representing the minimum uninterrupted execution time provided for a task.

Four pointers are provided in association with the demand interrupt list. A first of these pointers, denoted the "in" pointer, indicates a location in the list which corresponds to the current time. In the current time location, there is suitably provided a counter which contains a count of the tasks which have been entered into the queue during the present time interval (assuming for the moment that this count does not exceed the number of processors in the system). Each time that a task is entered into the queue, the count in the current time location counter is incremented by one. At the termination of each time interval $m$, the "in" pointer itself is incremented by one so that it now points to the next time slot in the demand interrupt list as the current time interval.

A second of the four pointers associated with the demand interrupt list is designated the "interrupt" pointer whose function it is to always indicate a location in the demand interrupt list which is $w/m$, i.e., maximum waiting time $w$/time interval $m$, locations removed from the one indicated by the "in" pointer. The "interrupt" pointer is also incremented by one after each time interval, $m$. When the pointer is so incremented, the count in the slot in the demand interrupt list currently indicated by the "interrupt" pointer is the number of tasks which have been waiting for a time interval $w$ and, consequently, have to be executed during the current interval which has just begun. These tasks will always be indicated by addresses at the top of the queue since all preceding tasks have to have been already executed and all other tasks are further down on the queue.

A third pointer provided for the demand interrupt list is designated the "execute" pointer and indicates the oldest location in the list which contains a count of tasks to be executed other than zero. Whenever a processor is made available by the normal completion of the execution of a task and a new task is assigned to it, the count in the location indicated by the execute pointer is reduced by one. If the count becomes zero, then the "execute" pointer is set to indicate the oldest remaining location having a count other than zero. Thus, if all of the tasks indicated in a given location have been executed by the time that the "interrupt" pointer is set to point to that location, the count in the location will be zero and no processor need be interrupted.

The maximum number of processors which can be interrupted is, of course, the number of processors in the processing system. Thus, if a more than that maximum number of tasks arrive during a given time interval $m$, and if all the arrived tasks are still waiting for execution at the end of the stipulated waiting time $w$, then apparently all of the latter tasks cannot, at this juncture, be respectively assigned to processors for execution. Therefore, in this contingency, in order to still further guarantee as far as is possible, a waiting time not exceeding the prescribed maximum time $w$, a fourth pointer is provided associated with the demand interrupt list. The function of the fourth pointer is, in effect, to cause the appropriate shifting of all of the tasks forward when more than $n$ tasks arrive in a single time interval $m$ where $n$ is the total number of processors.

This fourth pointer which may suitably be designated as the "unfilled" pointer indicates the preceding slot which is closest to the current "in" slot whose count of tasks has not exceeded the value $n$. Normally, the current slot is the "in" slot. But when the count in the latter slot attains the value $n$, then a search is made for the next preceding slot which contains a count less than $n$. As more tasks are indicated on the TS queue during the current time interval, then the count in the location indicated by the "unfilled" pointer is incremented by one each time a task is added thereinto until this count reaches $n$ and a search is again made for the nearest previous unfilled slot. The foregoing arrangement affects only the counts in the slots, the tasks still being executed in the order that they are received. The counts in the respective locations in the "demand interrupt" list are such that all tasks have a maximum waiting time of $w$ unless there are more than $$\frac{n \times w}{m}$$

tasks. The latter case signifies that there are not enough processors and time in the system to give to each task its minimum execution time $m$ without causing some tasks to wait for execution more than the maximum waiting period $w$.

Thus, with the foregoing time-sharing arrangement constructed in accordance with the principles of the invention, only when the processing system is near being overloaded is the execution of tasks interrupted at a rate such as is utilized in time-slicing systems. The inventive arrangement causes the processing system to react to the number of tasks awaiting execution by, in effect, shortening or lengthening the uninterrupted execution time rather than by allotting more or fewer fixed time slices to each task within a given time interval.

The diagrams shown in FIGS. 1A–1C, 2A–2C and 3A–3C are employed to illustrate example of the use of the processor allocation scheme. In each of the series of figures, the structure designated A represents the time-sharing (TS) queue, the structure designated B (DIL) represents the demand interrupt list and the structure designated C represents the four pointers associated with the demand interrupt list, viz., the "interrupt," "execute," "unfilled" and "in" pointers. These figures are explained immediately hereinbelow using as an example a two processor system with 10 terminals attached thereto and wherein each terminal is guaranteed a minimum uninterrupted execute time of $t$ and a maximum wait time of $4t$, i.e., a duration of four time slots.

Figure 1B:
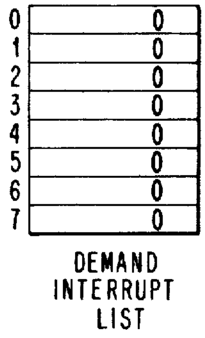
Figure 1C:
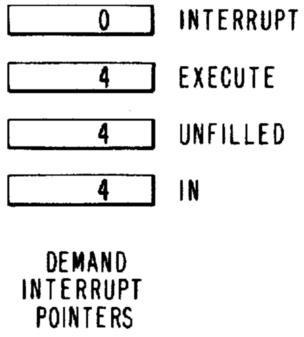

Referring now to FIGS. 1A to 1C, there is represented therein the initial condition in which the TS queue (FIG. 1A) is empty and the demand interrupt queue (FIG. 1B) has been cleared to zero. At this time, the interrupt pointer (FIG. 1C) is set to the initial location of the demand interrupt list. Since in the worst case, the wait time is $4t$, the "in" pointer is initially set to indicate the slot in the demand interrupt list which is located four time intervals from the initial location, i.e., the one pointed to by the interrupt pointer. The "execute" and "unfilled" pointers also indicate, i.e., point to, the slot indicated by the "in" pointer. At this time, of course, the two processors are waiting for jobs to execute.

Let it be assumed now that terminals 0, 1, 2 and 3 make requests in that order for respective tasks to be executed. The task from terminal 0 is entered into the TS queue. When this occurs, the count in the slot of the demand interrupt list is incremented by one. A processor picks up this task and the count is decremented by one. Thus, the count in slot 4 is reset to zero. The same events ensue when the task for execution from terminal 2 is entered into the TS queue. However, when the tasks from terminals 3 and 4 are entered on the TS queue, no processors are available. At this juncture, the queues and pointers have the values shown in FIGS. 2A–2C.

Figure 2A:
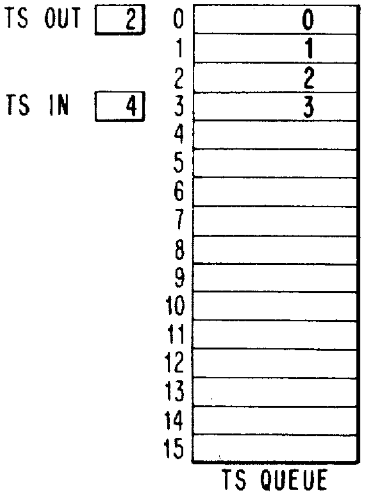
FIGS. 2A to 2C are depictions similar and corresponding to those of FIGS. 1A to 1C and showing the conditions obtaining in the time-sharing queue, the demand interrupt list and the demand interrupt pointers during a given stage of operation thereof.
Figure 2B:
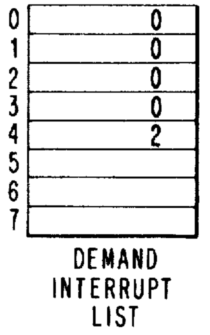
Figure 2C:
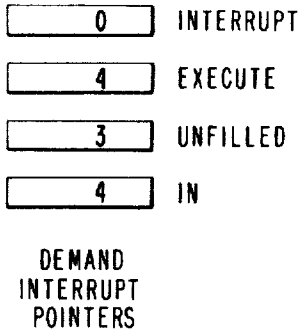

As seen in FIGS. 2A–2C, the "unfilled" pointer now indicates position 3 in the demand interrupt queue since position 4 is now filled. If terminal 8, for example, should at this point request execution of a task, such request will then be entered into position 4 of the TS queue, position 3 of the demand interrupt list will be incremented by one and the "execute" pointer will be changed to indicate position 3 of the demand interrupt list. This event has, in effect, caused task 2 to be shifted from slot 4 into slot 3 of the demand interrupt list so that, if, by the time the execute pointer indicates slot 3, task 2 has not yet been assigned a processor, a processor will be interrupted and assigned to this task. As a practical matter, such shifting is effected before it is really necessary to meet the maximum unit time of task 2, but has to be so done in order that the maximum wait time for task 4 can also be met. The shift of task 2 from slot 4 to slot 3, however, is accomplished not by an actual shift but merely by the changing of the count in slot 3 from 0 to 1.

Figure 3A:
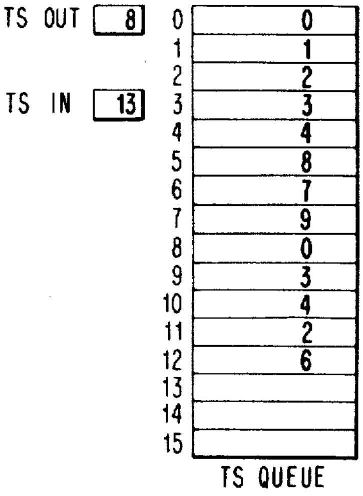
FIGS. 3A to 3C are depictions similar and respectively corresponding to those of FIGS. 1A to 1C, and 2A to 2C and showing the respective conditions obtaining at a further stage of operation.
Figure 3B:
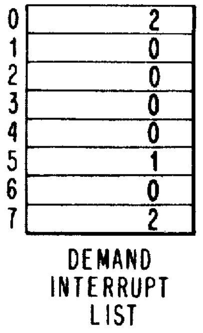
Figure 3C:
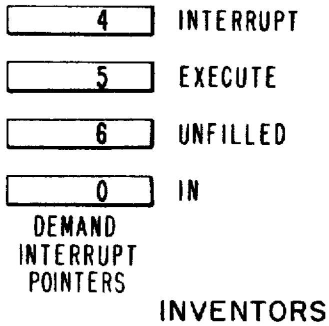

At some time later, the queues and pointers could have the values and configurations as shown in FIGS. 3A–3C. In FIG. 3A, the TS queue indicates that tasks 0, 3, 4, 2 and 6 are waiting to be executed. Since slot 4 on the demand interrupt list is the current "interrupt" slot and slot 0 is the current "in" slot (FIG. 3C), the 1 in slot 5 of the demand interrupt list indicates that task for execution from the terminal 0 must be assigned a processor in the next time interval. No processors need be interrupted during the second time interval because there is a 0 in slot 6 of the demand interrupt list. During the third time interval, both processors will have to be interrupted to execute tasks 3 and 4 if they have not been executed yet, and, during the fourth interval, both processors will have to be interrupted to similarly execute taske 2 and 6. If, however, a processor becomes available during the current time interval, it will obtain a new task to execute from the position in the TS queue indicated by the TS out pointer, and the counter in the slot indicated by the execute pointer will be decremented by one.

Figure 4:
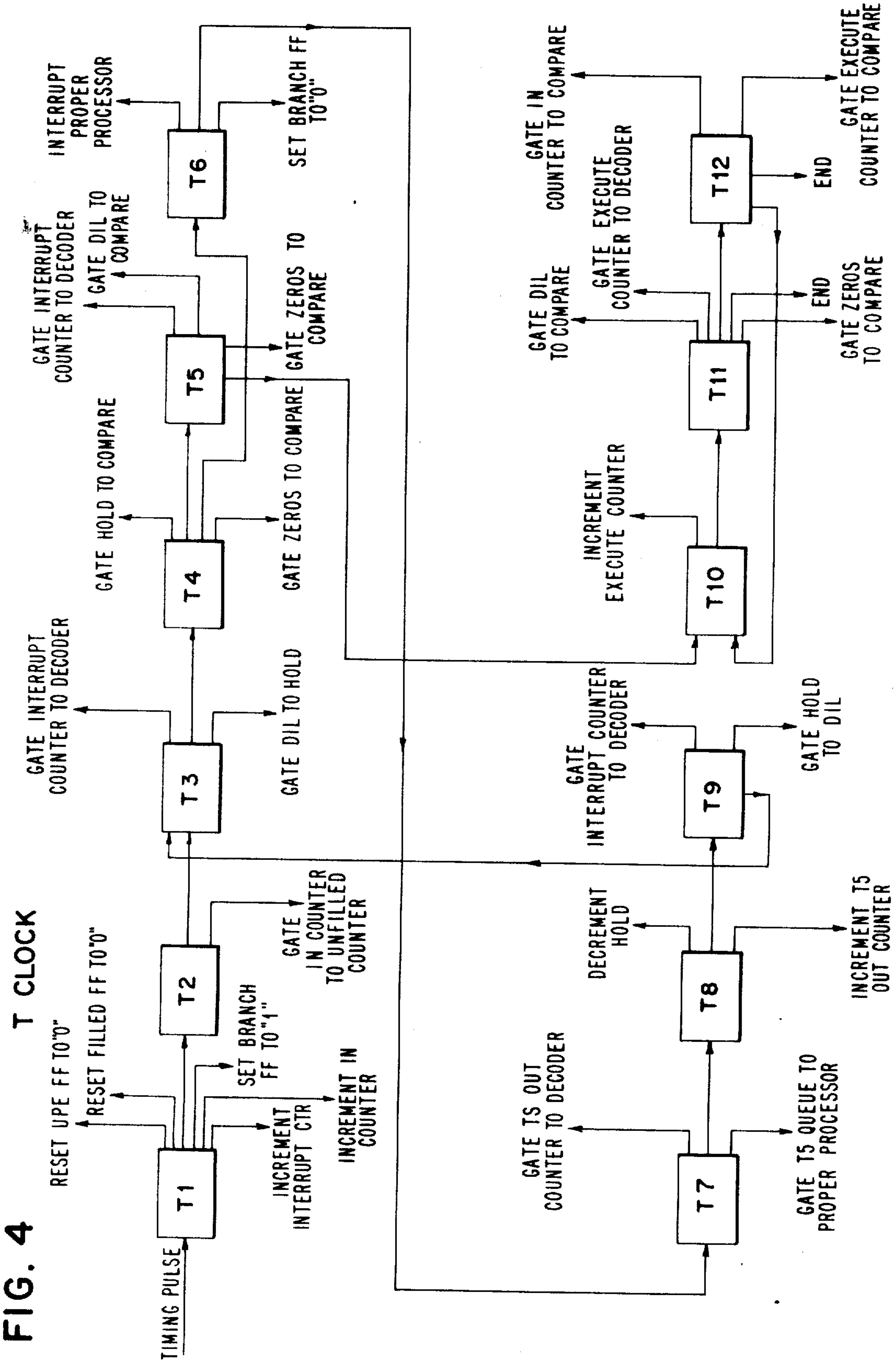
FIG. 4 is a block diagram of the T (task clock) which is used in the "task" microprogram.
Figure 5:
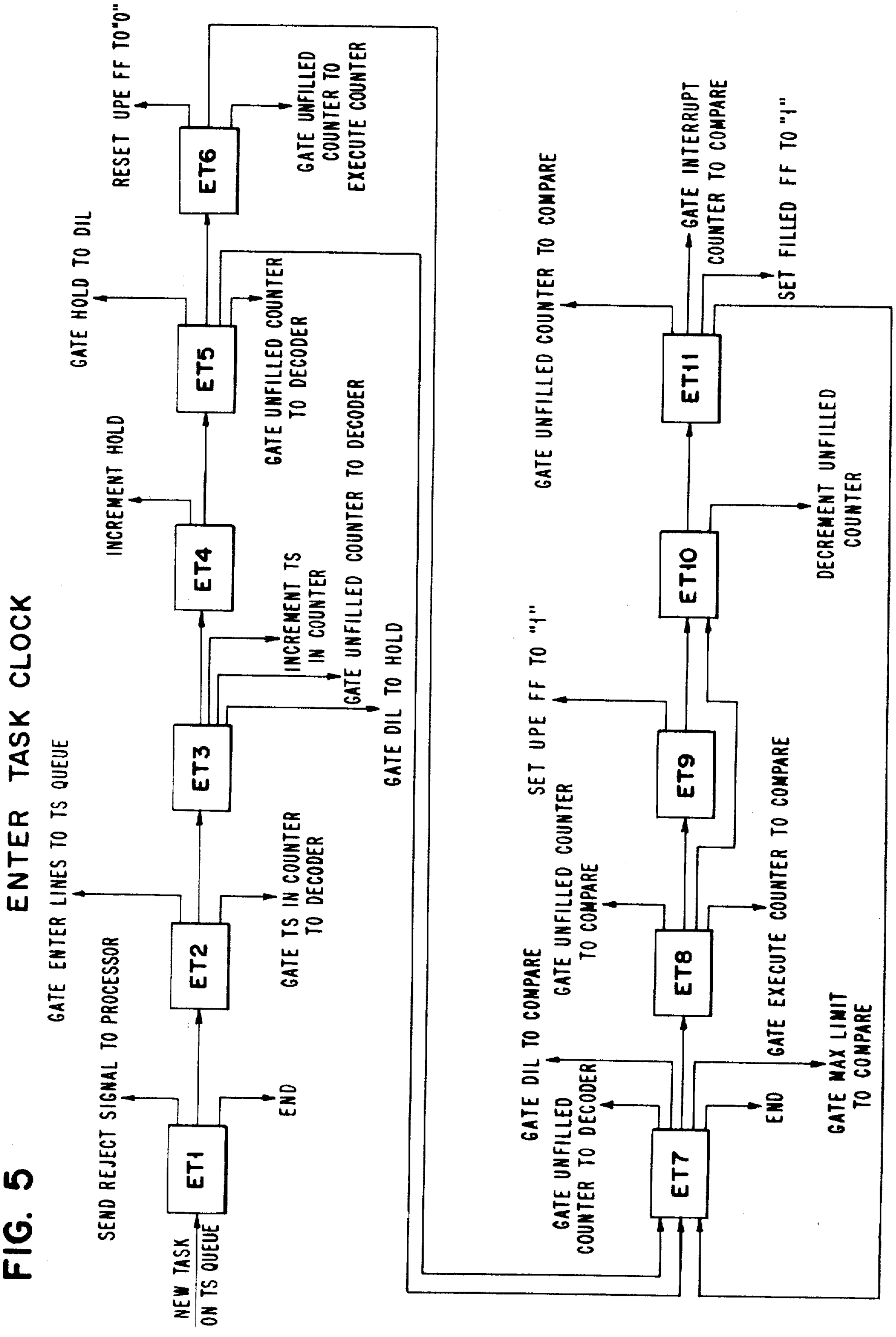
FIG. 5 is a block diagram similar to that shown in FIG. 4 of the ET (enter task) clock which is employed in the "enter task" microprogram.
Figure 6:
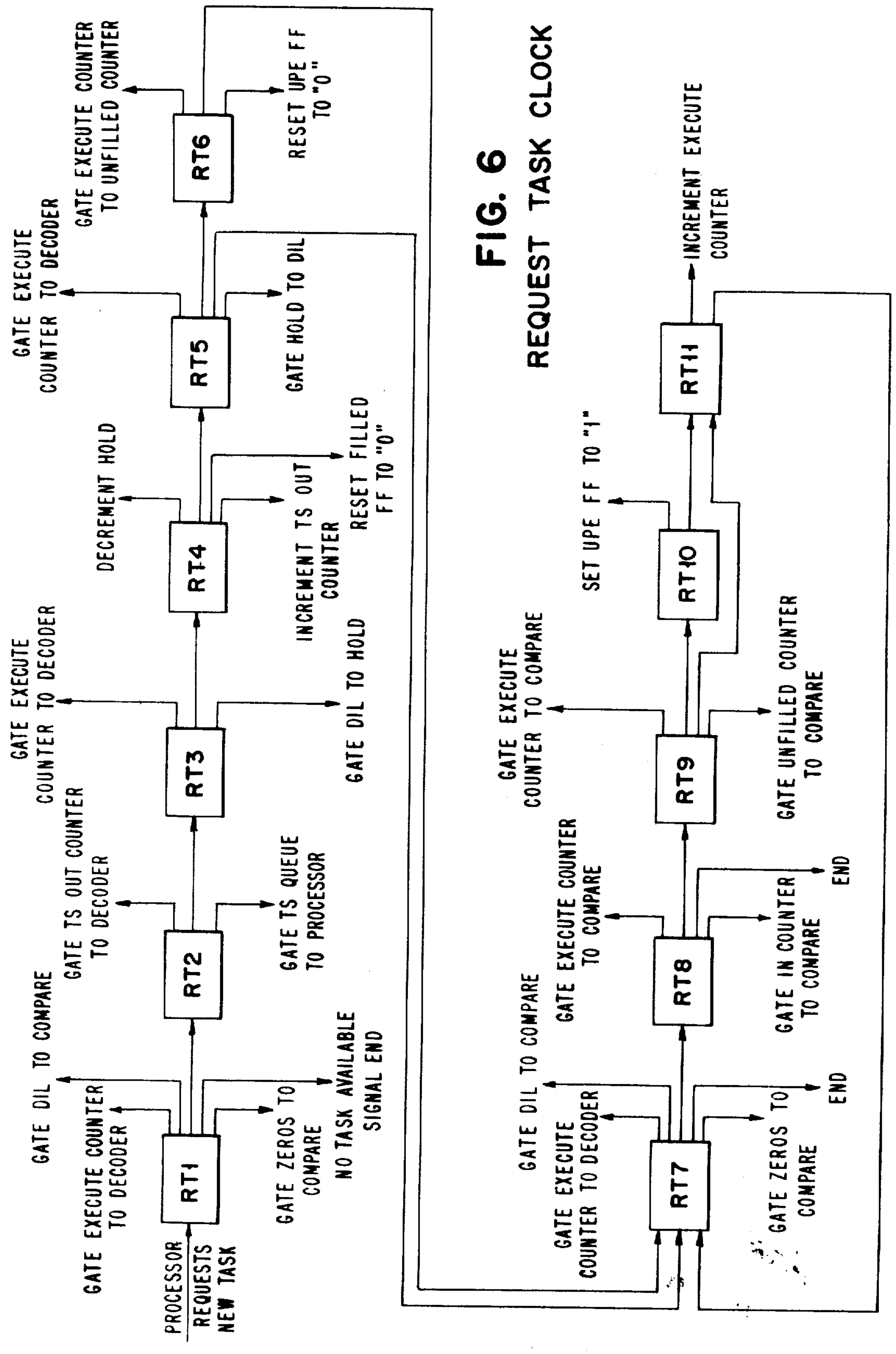
FIG. 6 is a block diagram, similar to those shown in FIGS. 4 and 5, of the RT (request task) clock which is utilized in the "request task" microprogram.

Reference is now made to the remaining FIGS. 7A–7D comprise a depiction of an illustrative embodiment constructed in accordance with the principles of the invention. FIGS. 4, 5 and 6 respectively are diagrams of microprogram clocks which are utilized to effect the operation of the embodiment shown in FIGS. 7A–7D.

Referring now to FIG. 4, there is shown therein the T clock which is utilized in one of the operative microprograms in the illustrative embodiment. This clock suitably comprises a plurality of monostable multivibrators which effect chosen respective operations while in their astable states and which, generally, switch the next succeeding monostable multivibrators in the clock to their astable states upon their reverting to their stable states.

FIG. 5 is a diagram of the enter task (ET) clock which effects the operation of the entering of a task into the TS queue. The enter task (ET) clock is similar in construction to that of the T clock, i.e., it also comprises a plurality of monostable multivibrators which cause the program operations in their astable states and which upon their reverting to their stable states switch that next or other multivibrators in the clock to their astable states.

FIG. 6 is a diagram of a clock similar to those shown in FIGS. 4 and 5 and is the clock which effects the microprogram for the operation wherein an available processor requests a task. The request task (RT) clock is similar in construction and in operation to that of the T and enter task (ET) clocks, i.e., it also comprises a plurality of serially arranged monostable multivibrators which effect operative functions in their astable states and which, upon their reversion to their stable states, switch the next succeeding or other monostable multivibrators in the clock to their astable states.

Figure 8:
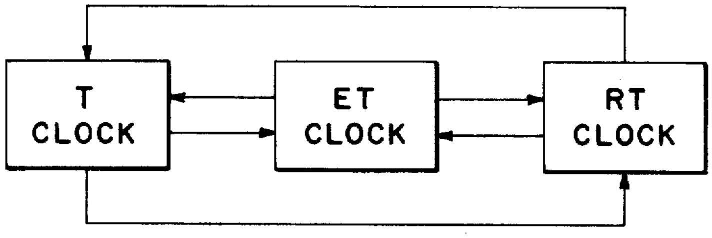
FIG. 8 is a block diagram which conceptually depicts an interlocking arrangement of the T, ET and RT clocks.

The clocks shown in FIGS. 4, 5 and 6 have to be interclocked such that only one thereof can be in operation at any one time. FIG. 8 conceptually depicts such interlocking. Since interlocking arrangements are well-known, any further detailing thereof is deemed unnecessary.

Figure 9:
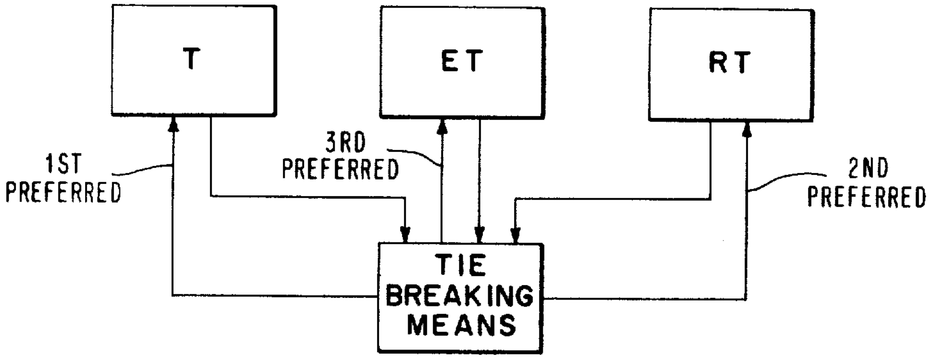
FIG. 9 is a block diagram which conceptually depicts a tie-breaking arrangement suitable for use in the selection for activation of the "task," "enter task," and "request task" microprograms.

There also exists the possibility that despite the interlocking of the three clocks there could occur a precise tie therebetween for the respective mircorprograms that they control. For such contingency, it is advantageous to include a well-known type of tie-breaking arrangement. Such tie-breaking arrangement is conceptually shown in FIG. 9. It is seen in this figure that the T clock receives first preference in the event of a tie, i.e., it is given preference in the event of a tie, i.e., it is given preference over both the request task and enter task clocks and that the request task clock is given preference over the enter task clock.

Figures 7, 7B:
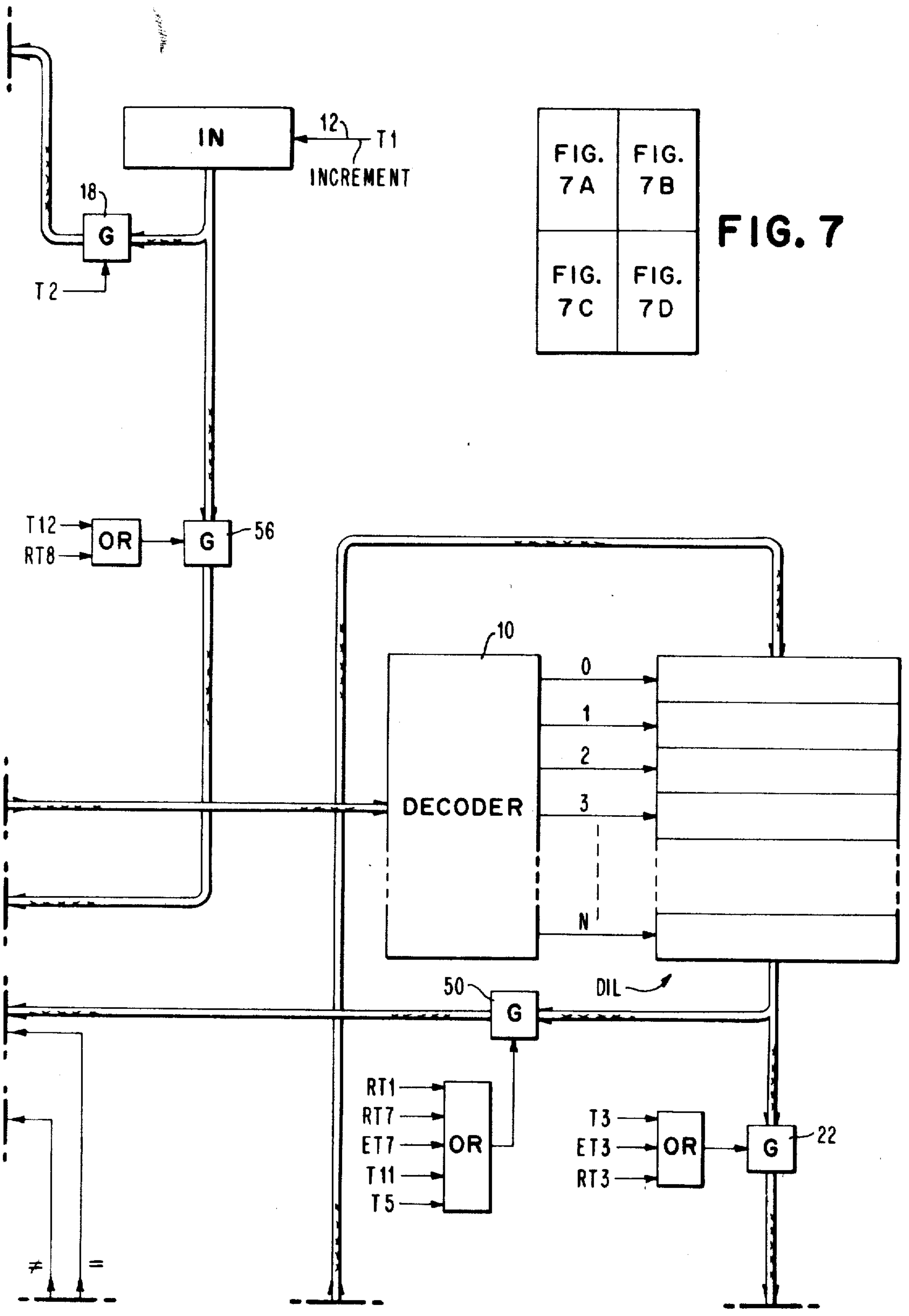
FIGS. 7A to 7D, taken together as in FIG. 7, is a logical diagram of an illustrative embodiment constructed in accordance with the principles of the invention.
Figure 10:
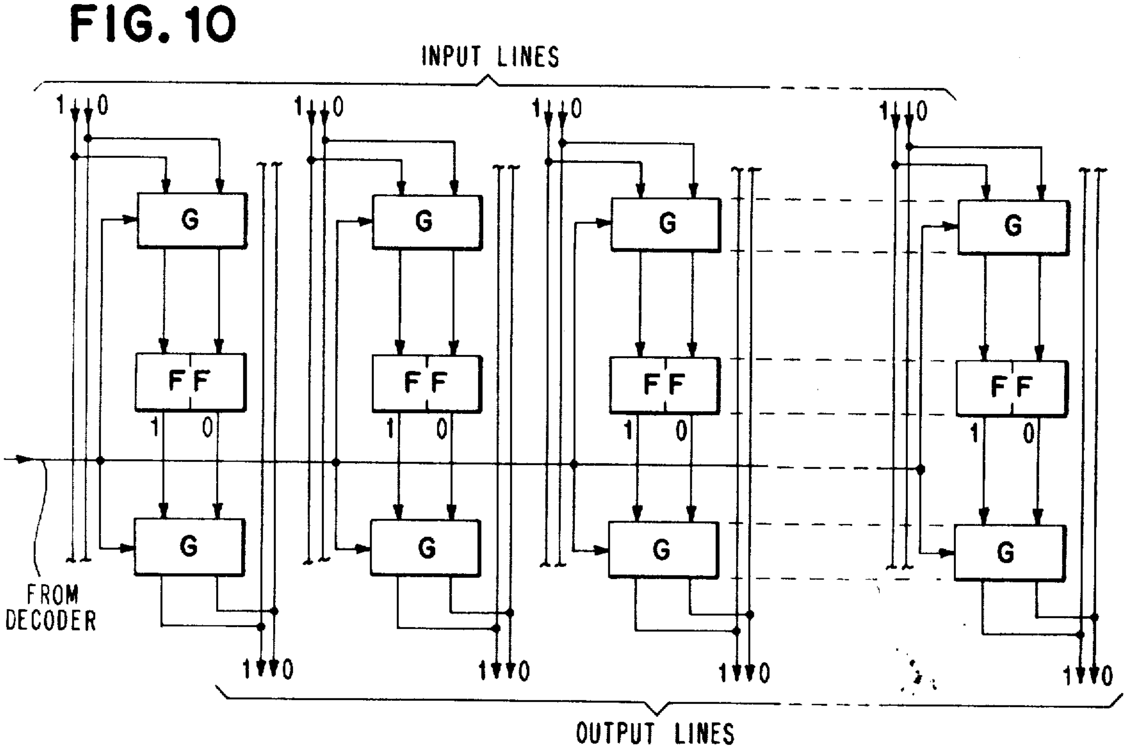
FIG. 10 is a block diagram of a register suitable for use as a component register of the demand interrupt list.

Reference is now made to FIGS. 7A–7D, i.e., the diagram of the illustrative embodiment. In FIG. 7B, there is shown a structure which comprises a group of registers which collectively constitute the "demand interrupt list," legended DIL. The individual registers of the demand interrupt list may each suitably take the form of the one depicted in FIG. 10. As seen in FIG. 10, the register comprises a horizontal row of flip-flops. If the line from the decoder is in the active state, it is operative to connect both the input lines and output lines to the paricular register to which it points in the demand interrupt list.

Referring back to FIGS. 7A–7D, the counters shown therein such as those legend "interrupt," "execute" and "unfilled" are decoded by a decoder 10. Only one line from the output of the decoder 10 is active at any given time. The maximum number of registers in the DIL is equal to the maximum count contained in a counter. Thus, if one of the aforementioned counters can contain a count from 0 to 15, there are 16 registers in the DIL which are also correspondingly numbered from 0 to 15. It is, of course, to be realized that the capacity of the counter and the corresponding number of registers can be chosen to be as long as desired provided that such numbers are ones wherein the counters, after reaching their limits, revert to zero.

Figure 7A:
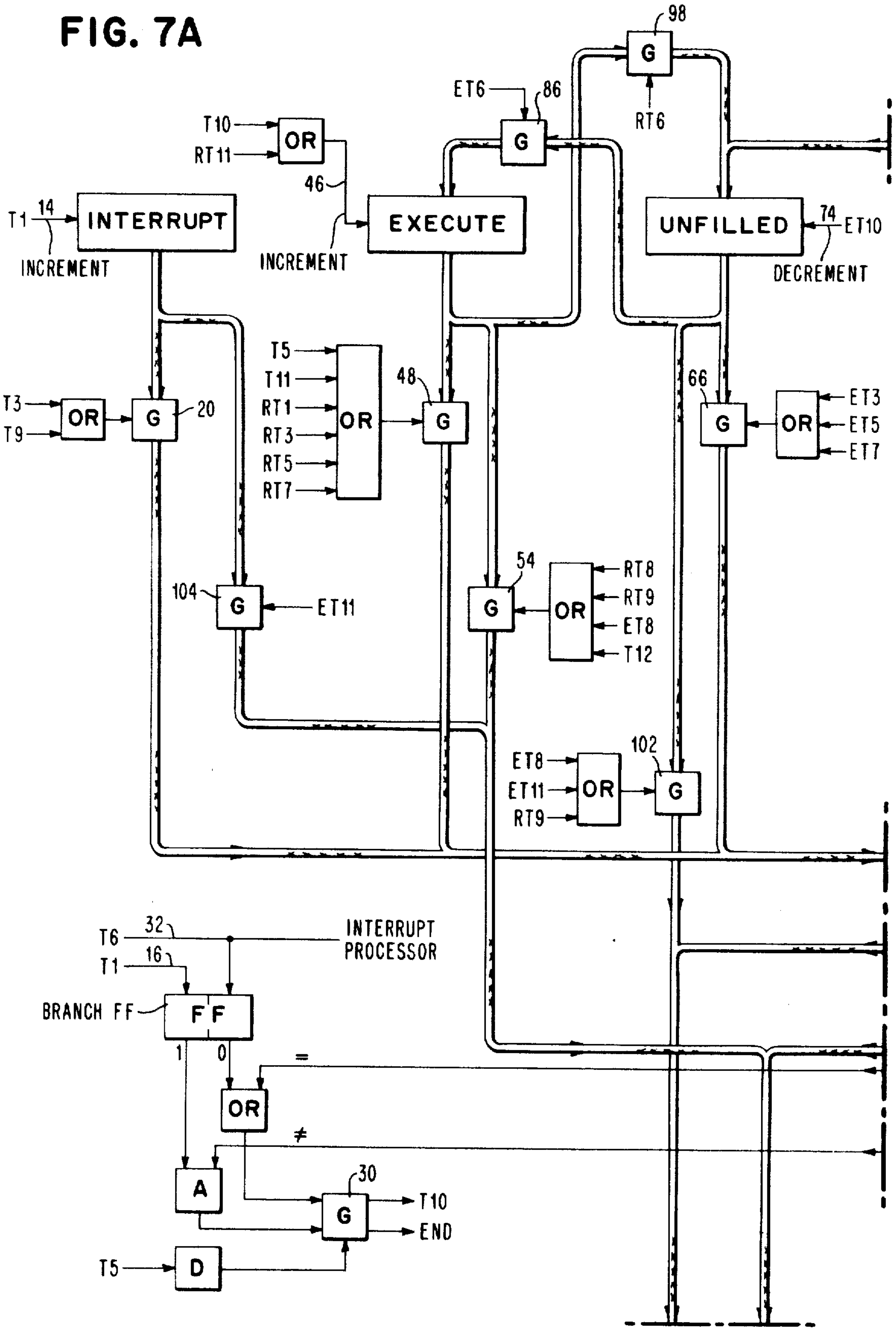
Figure 7C:
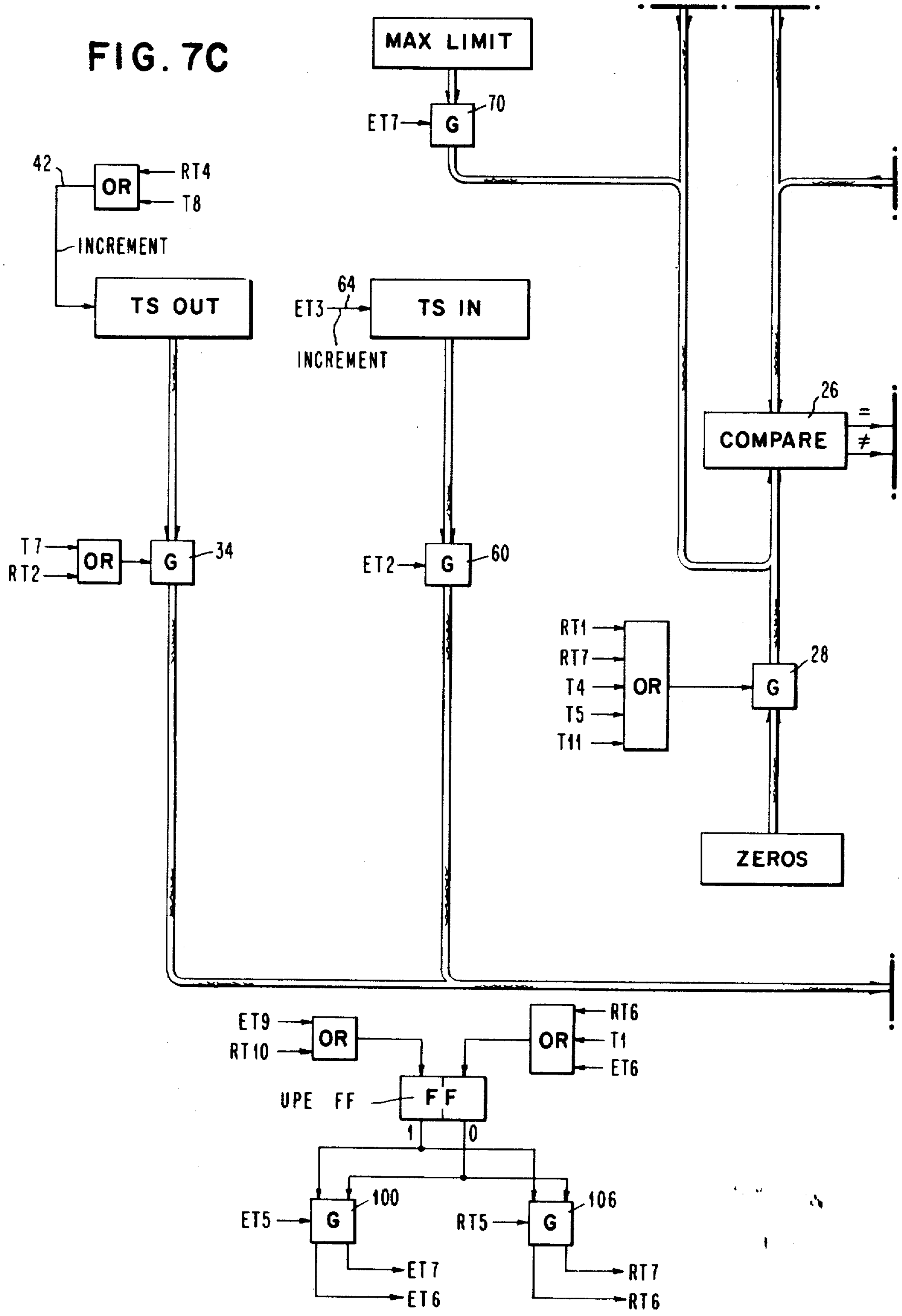
Figure 7D:
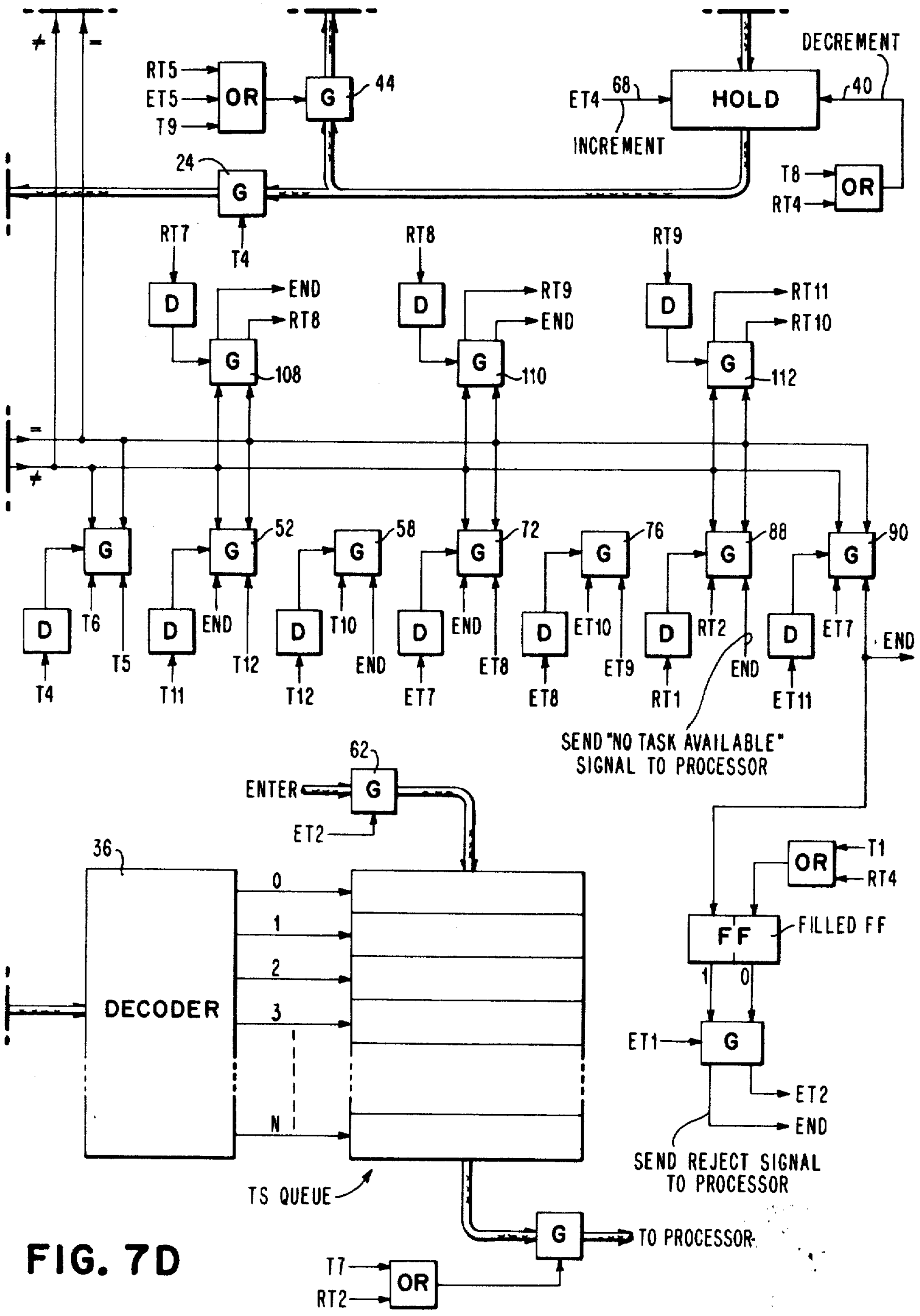

In FIG. 7D, the structure legend TS (timesharing) queue is a component similar in construction to that of the demand interrupt list (DIL) and may contain more registers than are present in the DIL. Also in FIG. 7C, the blocks legended TS out and TS in are counters which can point to a register in the TS queue, i.e., respectively designate the lower and upper limits of the currently active portion of the TS queue.

Figure 11:
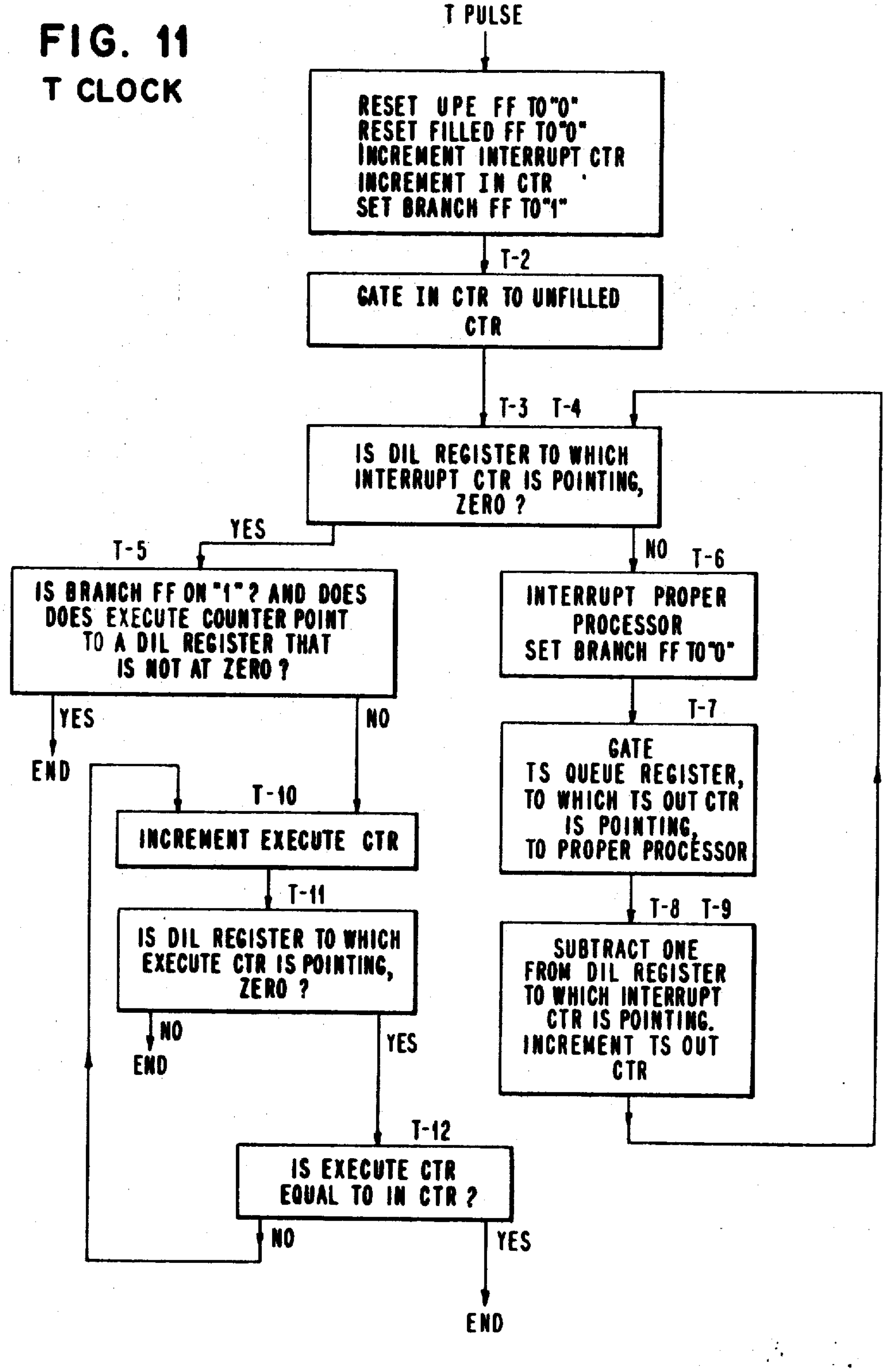
FIG. 11 is a flow chart of the T clock microprogram.

To understand the operation of the T clock with regard to the embodiment shown in the FIGS. 7A–7D, reference is also made now to FIG. 4 and FIG. 11 which is a flow chart of the T clock multiprogram. In the description of the T microprogram, as in the description of the ET and RT microprograms, for convenience of explanation, the astable pulse output of a monostable multivibrator in any of the T, ET and RT clocks is designated with the same notation as is the multivibrator from which it is produced. Thus, for example, the astable pulse output of monostable multivibrator T1 is referred to as pulse T1, etc.

As is seen in FIG. 7C, the T1 pulse is employed to reset a flip-flop legend UPE (unfilled precedes execute) to its zero state and in FIG. 7D, it is shown how the T1 pulse is employed to reset the filled flip-flop to its zero state. Clock pulse T1 is operative along a line 12 to increment the in counter and appears on line 14 where it is used to increment the interrupt counter. The T1 pulse also is effective on a line 16 where it is employed to set the branch flip-flop to its "1" state.

When pulse T1 terminates to switch monostable multivibrator T2 to its astable state, the T2 pulse is applied to a gate 18 in order to gate the contents of the in counter to the unfilled counter. The terminating of pulse T2 switches the multivibrator T3 to its astable state and its output T3 pulse is applied to a gate 20 in order to gate the contents of the interrupt counter to a decoder 10. Clock pulse T3 is also applied to a gate 22 (FIG. 7B) in order to gate the contents of the selected register in the DIL to the hold counter.

With the termination of the T3 pulse, multivibrator T4 is switched to its astable state and its T4 pulse output is applied to a gate 24 in order to gate the contents of the hold counter to one side of a compare unit 26. Pulse T4 is also applied to a gate 28 in order to gate zeros to compare unit 26. The output of compare unit 26 is then tested by clock pulse T4 through a slight delay in order to permit the output of compare unit 26 to stabilize. If the output of compare unit 26 indicates equality, then, at the termination of the T4 pulse, multivibrator T5 is switched to its astable state. If the output of compare unit 26 indicates inequality at this juncture, then, at the termination of pulse T4, it switches multivibrator T6 to its astable state.

The T5 pulse is applied to a gate 48 (FIG. 7A) in order to gate the contents of the execute counter to decoder 10. The T5 pulse is also applied to a gate 50 (FIG. 7B) in order to gate the contents of DIL to one side of compare unit 26. Also, pulse T5 is applied to gate 28 (FIG. 7C) in order to gate zeros to the other side of compare unit 26. As seen in FIG. 7A, pulse T5 is applied through a delay to a gate 30. If the output of the compare unit in this situation shows inequality and the "branch" flip-flop (FIG. 7A) is in its "1" state, the T clock operation ends at this point. If the output of compare unit 26 shows equality at this point or if the branch flip-flop is in its zero state, the termination of clock pulse T5 switches multivibrator T10 to its astable state.

If, as has been mentioned hereinabove, the output of compare unit 26 indicates inequality when tested by the T4 pulse, multivibrator T6 is switched to its astable state whereby the pulse T6 appears on line 32 and is used to interrupt a particular processor. Pulse T6 also resets the branch flip-flop to zero. When pulse T6 terminates, multivibrator T7 is switched to its astable state with the resulting pulse T7 being applied to a gate 34 in order to gate the contents of the TS Out counter to a decoder 36. Pulse T7 is also applied to a gate 38 in order to gate the contents of the register pointed to in the TS queue to the processor.

When pulse T7 terminates, it switches multivibrator T8 to its astable state, the T8 pulse output resulting thereby being applied to a line 40 in order to decrement the hold counter. Pulse T8 is also applied to a line 42 (FIG. 7C) in order to increment the TS Out counter. Upon the termination of pulse T8, multivibrator T9 is switched to its astable state whereby its output pulse T9 is applied to gate 20 in order to gate the contents of the interrupt counter to decoder 10. Pulse T9 is also applied to a gate 44 in order to gate the contents of the hold counter to the DIL where it is entered into the register pointed to by decoder 10. As mentioned hereinabove, if the output of compare unit 26 shows equality between zeros and the contents of the DIL under the control of pulse T5, multivibrator T10 is switched to its astable state when pulse T5 ends. With such occurrence, the resulting T10 pulse is applied to a line 46 (FIG. 7A) in order to increment the execute counter. When pulse T10 terminates, multivibrator T11 is switched to its astable state to produce the T11 pulse which is applied to a gate 48 in order to gate the contents of the execute counter to decoder 10. Pulse T11 is also applied to a gate 50 in order to gate the contents of the selected register in the DIL to one side of the compare unit 26 and to gate 28 in order to gate zeros to the other side of compare unit 26. Through a delay, pulse T11 is applied to a gate 52 in order to test the output of compare unit 26. If, in this situation, the output of compare unit 26 indicates equality, when pulse T11 terminates, multivibrator T12 is switched to its astable state. However, if in this situation the output of compare unit 26 indicates inequality, this signals the ends of the operation of the T clock.

The T12 pulse resulting from the switching of multivibrator T12 to its astable state is applied to a gate 54 in order to gate the contents of the execute counter to one side of compare unit 26. Pulse T12 is also applied to a gate 56 in order to gate the contents of the in counter to the other side of compare unit 26. At this time, pulse T12 is applied through a delay to a gate 58 in order to test the output of compare unit 26. If, as a result of such testing, the output of compare unit 26 shows equality, the operation of the T clock terminates. If the output of compare unit 26 at this point shows inequality, then at the termination of pulse T12, mutivibrator T10 is switched to its astable state.

There follows hereinbelow a description of the enter task microprogram which is controlled by the ET clock. The program is set forth on FIG. 12. The ET clock is caused to operate each time a new task is placed in the TS queue, i.e., the clock is initiated by the setting of multivibrator ET1 at such time.

Pulse ET1 is employed to test the filled flip-flop as shown in FIG. 7D. If this flip-flop is in its "0" state, then at the termination of the ET1 pulse multivibrator ET2 is switched to its astable state. If the filled flip-flop, however, is in its "1" state, the operation of the ET clock terminates and a reject signal is sent to the processor to indicate that there is no more space in the queue.

Pulse ET2 is applied to a gate 60 (FIG. 7C) in order to gate the contents of the TS In counter to decoder 36. Pulse ET2 is also applied to a gate 62 which gates the "enter" lines to the TS queue. Upon the termination of the ET2 pulse, multivibrator ET3 of the ET clock is switched to its astable state and its resulting pulse output ET3 is applied on a line 64 (FIG. 7C) in order to increment the TS In counter. The pulse ET3 is also applied to a gate 66 (FIG. 7A) in order to gate the contents of the unfilled counter to decoder 10. Pulse ET3 further is applied to gate 22 in order to gate the contents of the selected register of the DIL to the hold counter. Upon the termination of pulse ET3, multivibrator ET4 of an ET clock is switched to its astable state and its resulting pulse output ET4 is employed to increment the hold counter through a line 68 (FIG. 7D). When pulse ET4 terminates, multivibrator ET5 is switched to its astable state and its pulse output ET5 is applied to gate 66 in order to gate the contents of the unfilled counter to decoder 10. Pulse ET5 is applied to gate 44 to gate the contents of the hold counter to the selected register in the DIL. Through a delay, pulse ET5 is also applied to a gate 100 in order to test the output of the UPE flip-flop. If the latter flip-flop is in its "1" state, i.e., its set state, upon the termination of the pulse ET5, multivibrator ET6 is switched to its astable state. However, if at this juncture, the UPE flip-flop is in its "0" state, i.e., its reset state, upon the termination of pulse ET5, multivibrator ET7 is switched to its astable state.

The output of multivibrator ET6, i.e. pulse ET6, is applied to a gate 86 (FIG. 7A) in order to gate the contents of the unfilled counter to the execute counter. It is also applied to reset the UPE flip-flop to the "0" state.

The ET7 pulse of multivibrator ET7 is applied to gate 66 in order to gate the contents of the unfilled counter to decoder 10. It is also applied to gate 50 in order to gate the contents of the selected DIL register to one side of compare unit 26. Pulse ET7 is also applied to a gate 70 in order to gate the contents of a maximum limit register (FIG. 7C) to the other side of compare unit 26. Through a delay, pulse ET7 is applied to a gate 72 in order to test the output of compare unit 26. If the output of compare unit 26 shows equality, then upon the termination of pulse ET7, multivibrator ET8 is switched to its astable state. If the output of compare unit 26 at this juncture shows inequality, the operation of the ET clock terminates.

The pulse output of multivibrator ET8, i.e., pulse ET8, is applied to a gate 102 (FIG. 7A) in order to gate the contents of the unfilled counter to one side of compare unit 26. It is also applied to gate 54 in order to gate the contents of the execute counter to the other side of compare unit 26. Pulse ET8 is also applied through a delay to gate 76 in order to test the output of compare unit 26. If, in this situation, the output of compare unit 26 shows equality, then upon the termination of pulse ET8, multivibrator ET9 is switched to its astable state. However, if the output of compare unit 26 at this point shows inequality, then upon the termination of pulse ET8, multivibrator ET10 is switched to its astable state.

The ET9 pulse output of multivibrator ET9 is employed to set the UPE flip-flop to the "1" state.

The ET10 pulse output of multivibrator ET10 is applied to line 74 in order to decrement the unfilled counter. Upon the termination of pulse ET10, multivibrator ET11 is switched to its astable state.

Pulse ET11, the astable output of multivibrator ET11, is applied to gate 102 in order to gate the contents of the unfilled counter to one side of compare unit 26. It is also applied to a gate 104 (FIG. 7A) in order to gate the contents of the interrupt counter to the other side of compare unit 26. Pulse ET11 further is applied through a delay to gate 90 in order to test the output of compare unit 26. If the result of this latter testing shows equality, the filled flip-flop is set to its "1" state and the operation of the ET clock terminates. If the output of compare unit 26 when tested at this time shows inequality, then upon the termination of pulse ET11, multivibrator ET7 is switched to its astable state to cause the series of operations which ensue from such switching.

Figure 13:
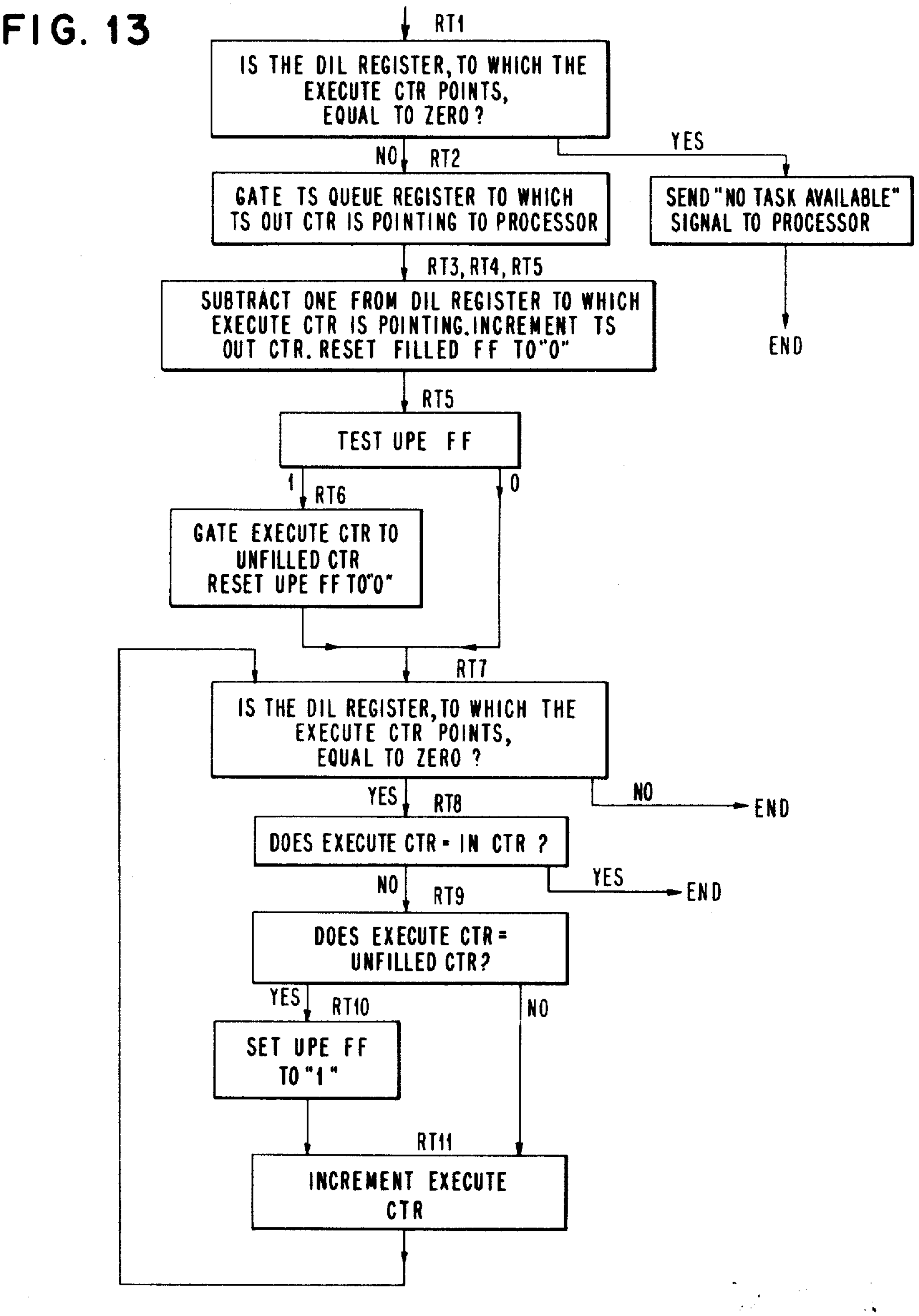
FIG. 13 is a flow chart of the RT clock microprogram.

In accordance with the invention, when a processor completes a task, it requests a new task. Such request causes the initiation of the operation of the request task (RT) clock microprogram as depicted in FIG. 13. The initiation of operation of this clock (FIG. 6) is the switching of a multivibrator RT1 to its astable state to produce a pulse output RT1 which is applied to gate 48 in order to gate the contents of the execute counter to decoder 10. Pulse RT1 is also applied to gate 50 in order to gate the contents of the selected DIL register to one side of compare unit 26. Pulse RT1 further is applied to gate 28 in order to gate zeros to the other side of compare unit 26. Through a delay, pulse RT1 is also applied to gate 88 in order to test the output of compare unit 26. If the result of this test shows equality in the output of compare unit 26, then the operation of the RT clock terminates. However, if the output of compare unit 26 at this point shows inequality, then at the termination of pulse RT1, a multivibrator RT2 is switched to its astable state to produce its pulse output RT2.

Pulse RT2 is applied to gate 34 in order to gate the contents of the TS Out counter to decoder 36. Pulse RT2 is also applied to gate 38 in order to gate the contents of the selected register in the TS queue to the processor. Upon the termination of pulse RT2, a multivibrator RT3 is switched to its astable state to produce its astable pulse output RT3.

Pulse RT3 is applied to gate 48 in order to gate the contents of the execute counter to decoder 10. Pulse RT3 is also applied to gate 22 in order to gate the contents of the selected DIL register to the hold register. Upon the termination of the RT3 pulse, a multivibrator RT4 is switched to its astable state to produce its pulse output RT4.

Pulse RT4 is applied to line 40 in order to decrement the hold counter. It is also applied to line 42 in order to increment the TS Out counter. Pulse RT4 further is applied to reset the filled flip-flop to its zero state. Upon the termination of pulse RT4, multivibrator RT5 is switched to its astable state to produce its pulse output RT5.

Pulse RT5 is applied to gate 48 in order to gate the contents of the execute counter to decoder 10. It is also applied to gate 44 in order to gate the contents of the hold register to the DIL. Pulse RT5 is further applied to a gate 106 (FIG. 7C) in order to test the UPE flip-flop. If the latter flip-flop is in its "1" state, then upon the termination of pulse RT5, a multivibrator RT6 is switched to its astable state to produce its output pulse RT6. If, however, upon being tested, the UPE flip-flop is in its "0" state, then upon the termination of pulse RT5, a multivibrator RT7 is switched to its astable state to produce its pulse output RT7.

Pulse RT6 is applied to gate 98 in order to gate the contents of the execute counter to the unfilled counter. It is also applied to reset the UPE flip-flop to its "0" state.

Pulse RT7 is applied to gate 48 in order to gate the contents of the execute counter to decoder 10. It is also applied to gate 50 in order to gate the contents of the selected DIL register to one side of the compare unit 26. Pulse RT7 is further applied to gate 28 in order to gate zeros to the other side of compare unit 26. Through a delay, pulse RT7 is applied to gate 108 in order to test the output of compare unit 26. If upon being so tested, the output of compare unit 26 shows equality, then, upon the termination of pulse RT7, a multivibrator RT8 is switched to its astable state to produce its pulse output RT8. If, however, at this point, upon being tested the output of compare unit 26 shows inequality, the operation of the RT clock terminates.

Pulse RT8 is applied to gate 54 in order to gate the contents of the execute counter to one side of compare unit 26. It is also applied to gate 56 in order to gate the contents of the In counter to the other side of compare unit 26. Through a delay, pulse RT8 is applied to a gate 110 in order to test the output of compare unit 26. If, upon being tested, the output of compare unit 26 shows equality, the operation of the RT clock terminates. However, if upon being tested at this point, the output of compare unit 26 shows inequality, then upon the termination of pulse RT8, a multivibrator RT9 is switched to its astable state to produce its pulse output RT9.

Pulse RT9 is applied to gate 54 in order to gate the contents of the execute counter to one side of compare unit 26. It is also applied to gate 102 in order to gate the contents of the unfilled counter to the other side of compare unit 26. Through a delay, pulse RT9 is applied to a gate 112 in order to test the output of compare unit 26. If, upon being tested at this time, the output of compare unit 26 shows equality, then, upon the termination of the RT9 pulse, a multivibrator RT10 is switched to its astable state to produce its pulse output RT10. If, however, upon being tested, the output of compare unit 26 shows inequality, then, upon the termination of pulse RT9, a multivibrator RT11 is switched to its astable state to produce its pulse output RT11.

Pulse RT10 is applied to set the UPE flip-flop to its "1" state. Upon the termination of pulse RT10, multivibrator RT11 is switched to its astable state to produce its RT11 pulse output.

Pulse RT11 is applied to line 46 in order to increment the execute counter. Upon the termination of the RT11 pulse, multivibrator RT7 is switched to its astable state to initiate the sequence of events that ensue in response to production of pulse RT7.

In reviewing the operation of the foregoing described system, it is to be noted that when the system is first started, the TS queue shown in FIG. 7D is empty. At this point, the contents of the TS Out counter are equal to the contents of the TS In counter.

The interrupt counter, shown in FIG. 7A, always points to a DIL register whose contents contain a zero count except during the operation of the T clock.

The execute counter points to the first register in the DIL at or after interrupt whose contents are other than zero. If there does not at that moment exist such a DIL register, then the execute counter points to the same DIL register as the one to which the In counter points.

The unfilled counter points to the last register at or before the register to which the In counter points and which contains less than the maximum limit.

The In counter always points to the current time slot.

The UPE flip-flop, as has been stated hereinabove, is an abbreviation for "unfilled precedes execute." It is to be noted in FIG. 12, i.e., the flow chart for the microprogram effected by the ET clock, that the unfilled counter is decremented at least once. If the contents of the unfilled counter should happen to be equal to the contents of the execute counter, prior to the decrementing of the unfilled counter, then, after the decrementing of the unfilled counter, its contents will be less than that of the execute counter. It is necessary to keep track of this latter condition so that, on the next ET clock cycle, the contents of the execute counter are made equal to that of the unfilled counter.

During an RT clock cycle, the UPE flip-flop is also required for operation. In this connection, it is to be noted on FIG. 12, the flow chart for the microprogram controlled by the RT clock ,that the execute counter is incremented at least once. If, before the execute counter is so incremented, it is ascertained that the contents of the execute counter are equal to those of the unfilled counter, then, the UPE flip-flop is set to its "1" state. It is set to its "1" state in order that, on a following RT cycle, the contents of the unfilled counter can be made equal to those of the execute counter.

Refering again to FIG. 12, it is noted that no tasks are entered into the DIL slot to which the interrupt counter points. After the unfilled counter is decremented, a test is made to ascertain whether the contents of the unfilled counter are equal to the contents of the interrupt counter. If the respective contents are equal to each other, the filled flip-flop is set to the "1" state to thereby prevent any further tasks from being entered into the DIL.

In FIG. 13, it is noted that at the beginning of the RT clock cycle, if the contents of the DIL register to which the execute counter points are equal to zero, that there is no task available for the processor. In such case, the only DIL register which can satisfy this condition is the DIL register to which the In counter points. When a task is given to the processor, the DIL register to which the execute counter points is decremented by one. If the contents of this latter register become equal to zero, generally the contents of the execute counter would be incremented. However, if this register happens to be the one to which the In counter points, it is impossible to increment the execute counter further. Under these conditions, the contents of the execute counter are equal to the contents of the In counter until an ET cycle occurs.

FIGS. 14A and 14B are included to illustrate a sequence of cycles. In these figures, it is assumed that, initially, the interrupt counter points to the #0 DIL register, the execute counter points to the #4 DIL register, the unfilled counter points to the #4 DIL register, and the In counter points to the #4 DIL register. Such conditions signify that each task is guaranteed at least one time slot of execution during the next four time slots. Hopefully, a respective task will receive several time slots of execution if it needs them and will be executed without interruption.

In the first twenty-one cycle components shown in FIGS. 14A and 14B, it is assumed that there is a maximum of two processors assigned to the time-sharing queue. In the twenty-second to the thiry-seventh cycle components, it is assumed that there is only one processor assigned to the time-sharing queue.

In recapitulating the foregoing description, it may be stated that the purpose of the invention is to guarantee a time-sharing user at least one time slice of task execution during a wait time following his request, where the wait time is some number of time slices prespecified by a supervisor, operator, installation manager or designer, while at the same time postponing the granting of this time slice as long as possible, so as to permit tasks currently being executed to proceed for as long as possible without interruption. Interruptions, as been stated hereinabove, are undesirable because they involve moving data in and out of storage. To achieve the object of the invention, the number of tasks whose execution have to begin at each time slice have to be kept track of with the interrupting of other tasks if it is so necessary. The maximum number of tasks whose executions can be started in any given time slice is equal to the number of processors currently assigned to time-sharing.

The DIL is a group of registers which are employed cyclically. Conceptually, the DIL can be considered as an infinite set of registers, one register for each time slice from now to infinity. The In pointer points to the current time slice, i.e., the register that is associated with the current time. The interrupt pointer points to a time slice one wait time behind the In pointer. Each time a time slice terminates, the interrupt and In pointers are each respectively moved along to point to the next register. Thus, if the In pointer points to a register at a certain moment, the interrupt pointer points to it one wait time later. If the system is not fully loaded, when a task request for execution (ET) comes in, the task is placed on the TS queue and the DIL is altered to reflect the need to start such task within one wait time. If the slot pointed to by the In pointer contains less than the maximum limit, it is only necessary to add one to the contents of this slot, such incrementing corresponding to the fact that the execution of the new task has to be initiated at the time when the interrupt pointer reaches the last-named slot. If, however, that slot contains the maximum limit, then the execution of the new task is still to be started at that time, but the execution of some prior task will have to be started earlier in order to keep the number of starts per slot equal to or less than the number of processors. Therefore, the contents of the most recent slot which contains less than the maximum limit is incremented by one, such action being the equivalent of re-scheduling one task from each of the slots from the In slot to the slot after, i.e., on the "In" side of, this unfilled one, the respective execution of each of these tasks now being scheduled to start one time slice earlier than formerly. It is to be noted that the executions of these tasks will now be started not when they require starting, but earlier in order that sufficient processors will be available later to meet the requirements of other task executions. Because it is constantly desired to fill the most recent slot which is not completely filled, the unfilled pointer is employed to point to such most recent slot and the unfilled pointer is moved as slots become filled or unfilled.

New tasks are entered into the TS queue in the order that they are received. The sum of the quantities in the registers in the DIL is equal to the number of tasks in the TS queue. Moreover, the numbers in the registers of the DIL refer to the entries in the queue in chronological order, so that, if the earliest slot not containing a zero contains a count of *n*, then the first *n* tasks in the TS queue have to be started during the time slice corresponding to the slot, i.e., at a time when the interrupt pointer points to the slot. Similarly, if the next such slot contains a count of *m*, then the next *m* tasks in the queue have to be started at the time corresponding to that slot.

To achieve maximum postponement of interruptions, therefore, when a processor becomes available, it is desired to assign that task for execution having the earliest required starting time for execution. This latter task will be at the head of the TS queue and it will have been counted in the oldest slot not containing a zero count. The necessary action, then, is for the processor to pick up the task at the head of the queue, and for the earliest slot, i.e., that one closest to the interrupt pointer to be decremented by one. Because it is constantly desired to locate the oldest non-zero slot, the execute pointer is employed to point to such oldest slot.

To manipulate the unfilled and execute pointers, it is convenient to keep track as to whether the unfilled pointer precedes the execute pointer, i.e., the unfilled pointer points to an older slot or whether it does not. To achieve such monitoring, the UPE flip-flop is employed. In this manner, the timing chain is kept going if there is an available unit to perform the task. If the UPE flip-flop is in its "1" state, then all slots from in through execute are filled. Therefore, if in such condition, the processor requests a task (RT), the unfilled pointer should be moved down to point to the slot pointed to by the execute pointer since the latter slot will no longer be filled, and, if a task is entered (ET), the execute pointer should be moved up to point to the slot pointed to by the unfilled pointer, since the last-named slot will now not be empty.

The number of processors assigned to time-sharing can readily be changed at any time. The supervisor inhibits the entering of tasks in the TS queue until the DIL has been cleared, changes the number in the maximum limit register and then permits all operations to proceed normally. With a slight change in the structure according to the invention, an arrangement could also be made to permit the changing of the number of processors working on time-sharing from time to time ("on the fly") and to cause the results of the comparison with the maximum limit to be equal or more than and less than, rather than equal and not equal. Also, there could be kept the greater of two numbers of processors working on time-sharing during the wait time following the changing of the maximum limit. Thus, at least the assumed number of processors would be available throughout the transition period. There would never be too few processors to handle the possible required number of interruptions at the beginning of a time slice and no inhibition would have to be placed on the entering of tasks.

The following chart sets forth the relationship of the operations under the control of the T clock shown in FIG. 4 and the operations shown in the flow chart in FIG. 11.

| Mono Number | Set conditions | Functions performed when set | Functions when timing out |
|---|---|---|---|
| T1 | A timing pulse | It resets "UPE" flip-flop to "0" (Fig. 7C). It resets filled flip-flop to "0" (Fig. 7D). It increments interrupt counter (Fig. 7A). It increments in counter (Fig. 7B). It sets branch flip-flop to "1" (Fig. 7A). | It sets T2. |
| T2 | The timing out of T1. | It gates the contents of the in counter (Fig. 7B) to the unfilled counter (Fig. 7A). | It sets T3. |
| T3 | The timing out of T2. The timing out of T9. | It gates the contents of the interrupt counter (Fig. 7A) to the unfilled counter (Fig. 7A). It gates the contents of the DIL (Fig. 7B) to the hold counter (Fig. 7D). | It sets T4. |
| T4 | The timing out of T3. | It gates the contents of the hold counter (Fig. 7D) to compare unit 26 (Fig. 7C). It gates zeros to compare unit 26. It tests the output of compare unit 26. | If the output of compare unit 26 upon being tested shows equality, it sets T5. If the output of compare unit 26 shows inequality, it sets T6. |
| T5 | The timing out of T4. | It gates the contents of the execute counter (Fig. 7A) to decoder 10 (Fig. 7B). It gates the contents of DIL to compare unit 26 (Fig. 7C). It gates zeros to compare unit 26. Through a delay, it tests output of branch flip-flop (Fig. 7A) and compare unit 26. | If the output of compare unit 26 upon being tested shows inequality and the branch flip-flop is at "1", the operation of the T clock ends at this point. If the output of compare unit 26 shows equality or the branch flip-flop is at "0", it sets T10. |
| T6 | The timing out of T4. | It interrupts the appropriate processor. It resets the branch flip-flop to "0". | It sets T7. |

CHART—Continued

| Mono Number | Set conditions | Functions performed when set | Functions when timing out |
|---|---|---|---|
| T7 | The timing out of T6. | It gates the contents of the TS out counter (Fig. 7C) to decoder 36 (Fig. 7D). It gates the TS queue (Fig. 7D) to the appropriate processor. | It sets T8. |
| T8 | The timing out of T7. | It decrements the hold counter (Fig. 7D). It increments the TS out counter (Fig. 7C). | It sets T9. |
| T9 | The timing out of T8. | It gates the contents of the interrupt counter (Fig. 7A) to decoder 10. It gates the contents of the hold counter (Fig. 7D) to DIL. | It sets T3. |
| T10 | The timing out of T5. The timing out of T12. | It increments the contents of the execute counter (Fig. 7A). | It sets T11. |
| T11 | The timing out of T10. | It gates the contents of the execute counter (Fig. 7A) to decoder 10. It gates DIL to compare unit 26 (Fig. 7C). It gates zeros to compare unit 26. Through a delay, it tests the output of compare unit 26. | If compare unit 26, on being tested, shows equality, it sets T12. If compare unit 26 shows inequality, the operation of the T clock ends at this point. |
| T12 | The timing out of T11. | It gates the contents of the execute counter (Fig. 7A) to compare unit 26 (Fig. 7C). It gates the contents of the in counter (Fig. 7B) to compare unit 26. Through a delay, it tests the output of compare unit 26. | If compare unit 26, on being tested, shows equality, the operation of the T clock ends at this point. If compare unit 26 shows inequality, it sets T10. |

Figure 12:
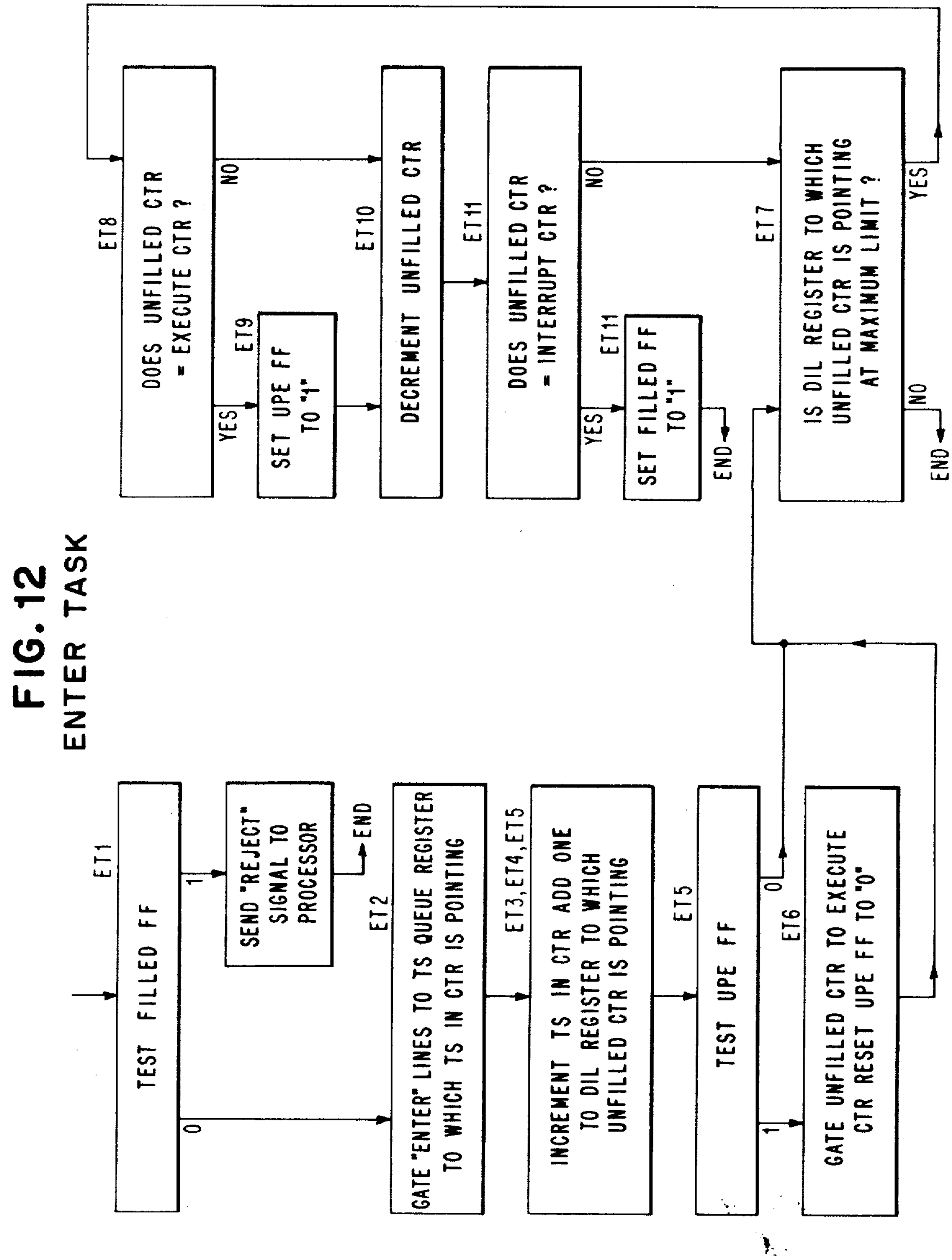
FIG. 12 is a flow chart of the ET clock microprogram.

The following chart sets forth the relationship of the operations under the control of the ET clock shown in FIG. 5 and the operations shown in the flow chart in FIG. 12.

| Mono Number | Set conditions | Functions performed when set | Functions when timing out |
|---|---|---|---|
| ET1 | A new task on the TS queue. | It tests the filled flip-flop (Fig. 7D) | If, upon being tested, the filled flip-flop is at "0", it sets ET2. If the filled flip-flop is at "1", it sends a reject signal to the processor and the operation of the ET clock ends. |
| ET2 | The timing out of ET1. | It gates the contents of the TS in counter (Fig. 7C) to decoder 36. It gates the enter lines to the TS queue (Fig. 7D). | It sets ET3. |
| ET3 | The timing out of ET2. | It increments the TS in counter (Fig. 7C). It gates the contents of the unfilled counter (Fig. 7A) to decoder 10. It gates the contents of DIL to the hold counter (Fig. 7D). | It sets ET4. |
| ET4 | The timing out of ET3. | It increments the hold counter | It sets ET5. |
| ET5 | The timing out of ET4. | It gates the contents of the unfilled counter to decoder 10. It gates the contents of the hold counter to DIL. It tests the UPE flip-flop (Fig. 7C). | If the UPE flip-flop on being tested is at "1", it sets ET6. If the UPE flip-flop is at "0", it sets ET7. |
| ET6 | The timing out of ET5. | It gates the contents of the unfilled counter (Fig. 7A) to the execute counter (Fig. 7A). It resets the UPE flip-flop to "0" (Fig. 7C). | It sets ET7. |
| ET7 | The timing out of ET5. The timing out of ET6. The timing out of ET11. | It gates the contents of the unfilled counter (Fig. 7A) to the execute counter. It gates the contents of DIL to compare unit 26. It gates the contents of the maximum limit register (Fig. 7C) to compare unit 26. Through a delay, it tests compare unit 26. | If, upon being tested, the output of compare unit 26 shows equality, it sets ET8. If compare unit shows inequality, the operation of the ET clock ends at this point. |
| ET8 | The timing out out of ET7. | It gates the contents of the unfilled counter to compare unit 26 (Fig. 7C). It gates the contents of the execute counter to compare unit 26. Through a delay, it tests the output of compare unit 26. | If, upon being tested, the output of compare unit 26 shows equality, it sets ET9. If the output of compare unit 26 shows inequality, it sets ET10. |
| ET9 | The timing out of ET8. | It sets the UPE flip-flop (Fig. 7C) to "1". | It sets ET10. |
| ET10 | The timing out of ET8. The timing out of ET9. | It decrements the unfilled counter. | It sets ET11. |
| ET11 | The timing out of ET10. | It gates the contents of the unfilled counter to compare unit 26. It gates the contents of the interrupt counter to compare unit 26. Through a delay, it tests the output of compare unit 26. | If, upon being tested, the output of compare unit 26 shows equality, the filled flip-flop (Fig. 7D) is set to "1" and the operation of the ET counter ends at this point. If the output of compare unit 26 shows inequality, it sets ET7. |

The following chart sets forth the relationship of the operations under the control of the RT clock shown in FIG. 6 and the operations shown in the flow chart in FIG. 13.

| Mono Number | Set conditions | Functions performed when set | Functions when timing out |
|---|---|---|---|
| RT1 | A processor requests a new task. | It gates the contents of the execute counter to decoder 10. It gates the contents of DIL (Fig. 7B) to compare unit (Fig. 7C). Through a delay, it tests the output of compare unit 26. | If, upon being tested, the output of compare unit 26 shows equality, it sends a "no task available" signal to the processor and the operation of the RT clock ends at this point. If the output of compare unit shows inequality, it sets RT2. |
| RT2 | The timing out of RT1. | It gates the contents of the TS out counter (Fig. 7C) to decoder 36 (Fig. 7D). It gates the TS queue (Fig. 7D) to the processor. | It sets RT3. |
| RT3 | The timing out of RT2. | It gates the contents of the execute counter to decoder 10 (Fig. 7B). It gates DIL to the hold counter (Fig. 7D). | It sets RT4. |
| RT4 | The timing out of RT3. | It decrements the hold counter (Fig. 7D). It increments the TS out counter (Fig. 7C). It resets the filled flip-flop (Fig. 7D) to "0". | It sets RT5. |
| RT5 | The timing out of RT4. | It gates the contents of the execute counter to decoder 10 (Fig. 7B). It gates the contents of the hold counter (Fig. 7D) to DIL. It tests the UPE flip-flop. | If the UPE flip-flop is at "1", it sets RT6. If the UPE flip-flop is at "0", it sets RT7. |
| RT6 | The timing out of RT5. | It gates the contents of the execute counter to the unfilled counter. It resets the UPE flip-flop to "0". | It sets RT7. |
| RT7 | The timing out of RT5. The timing out of RT6. The timing out of RT11. | It gates the contents of the execute counter to decoder 10. It gates the contents of the DIL register to compare unit 26. It gates zeros to compare unit 26. Through a delay, it tests the output of compare unit 26. | If, upon being tested, the output of compare unit 26 shows equality, it sets RT8. If the output of compare unit 26 shows inequality, the operation of the RT clock ends at this point. |
| RT8 | The timing out of RT7. | It gates the contents of the execute counter to compare unit 26. It gates the contents of the in counter (Fig. 7B) to compare unit 26. Through a delay, it tests the output of compare unit 26. | If, upon being tested, the output of compare unit 26 shows equality, the operation of the RT clock ends at this point. If the output of compare unit shows inequality, it sets RT9. |
| RT9 | The timing out of RT8. | It gates the contents of the execute counter to compare unit 26. It gates the contents of the unfilled counter to compare unit 26. Through a delay, it tests the output of compare unit 26. | If, upon being tested, the output of compare unit 26 shows equality, it sets RT10. If the output of compare unit 26 shows inequality, it sets RT11. |
| RT10 | The timing out of RT10. | It sets the UPE flip-flop (Fig. 7C) to "1". | It sets RT11. |
| RT11 | The timing out of RT9. The timing out of RT6. | It increments the execute counter. | It sets RT7. |

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A time-sharing arrangement in a processing system including a given plurality of entities capable of executing tasks and comprising:
   - means for establishing a queue of a plurality of tasks for execution from different jobs, said tasks being respectively chronologically entered into said queue;
   - means for establishing a list of a plurality of chronologically arranged time slots of substantially respectively equal durations; and
   - pointer means associated with said list for indicating the current time slot and other time slots in said list to provide a time period for execution of said tasks entered into said queue which is equal to a given multiple of a time slot duration.

2. A time-sharing arrangement as defined in claim 1 and further including second pointer means associated with said queue for respectively indicating the position in the queue which contains the currently first task and the position in the queue which contains the currently last task.

3. A time-sharing arrangement in a processing system comprising:
   - means for establishing a queue of a plurality of tasks for execution from different jobs presented to said system, said tasks being respectively chronologically entered into said queue;
   - means for establishing a list of a plurality of chronologically arranged time slots of respectively equal durations; and
   - pointer means associated with said list, said pointer means comprising,
   - a first pointer associated with said list for indicating a first and current time slot,
   - a second pointer associated with said list for indicating a second time slot which precedes said first time slot by a chosen number of said time slots, and
   - a third pointer associated with said list for indicating a third time slot which is the oldest time slot containing tasks which are to be executed,
   - said pointer means providing a time period for the execution of said tasks whose maximum duration is equal to said chosen number of time slots.

4. A time-sharing arrangement in a processing system which includes a given number of processing entities assigned to time-sharing comprising:
   - means for establishing a queue of a plurality of tasks for execution from different jobs presented to said system, said tasks being respectively chronologically entered into said queue;
   - means for establishing a list of a plurality of chronologically arranged time slots of respectively equal durations; and
   - pointer means associated with said list, said pointer means comprising,
   - a first pointer associated with said list for indicating a first and current time slot,
   - a second pointer associated with said list for indicating a second time slot which precedes said first time slot by a chosen number of said time slots,
   - a third pointer associated with said list for indicating a third and oldest time slot in said list which contains tasks to be executed, and
   - a fourth pointer associated with said list for indicating a fourth time slot in said list between said first and second time slots which contains a number of tasks to be executed which is less than said given number of processing entities, said pointer means providing a time period for the execution of said tasks whose maximum duration is equal to said given number of time slots.

5. A time-sharing arrangement in a processing system which includes a given number of processing entities assigned to time-sharing comprising:

means for establishing a queue of a plurality of tasks for execution from different jobs presented to said system, said tasks being respectively chronologically entered into said queue;

means for establishing a list of a plurality of chronologically arranged time slots of respectively equal durations;

first pointer means associated with said list, said pointer means comprising, a first pointer associated with said list for indicating a first and current time slot, a second pointer associated with said list for indicating a second time slot which precedes said first time slot by a chosen number of said time slots, a third pointer associated with said list for indicating a third and oldest time slot in said list which contains tasks to be executed, and a fourth pointer associated with said list for indicating a fourth time slot in said list between said first and second time slots which contains a number of tasks to be executed which is less than said given number of processing entities, said first pointer means providing a time period for the execution of said tasks whose maximum duration is equal to said given number of time slots;

second pointer means associated with said queue comprising, a first queue pointer for indicating the next location in said queue wherefrom a task is to be assigned to one of said processing entities for execution, and a second queue pointer for indicating the location in said queue wherein there has most recently been entered a task for execution.

6. A time-sharing arrangement in a multiprocessing system which includes a given number of processors assigned to time-sharing comprising:

means for establishing a queue having the length of said given number of tasks for execution from different jobs presented to said system, said tasks being respectively chronologically entered into said queue;

means for establishing a list of a plurality of chronologically arranged time slots of respectively equal durations;

first pointer means associated with said list, said pointer means comprising, a first pointer associated with said list for indicating a first and current time slot, a second pointer associated with said list for indicating a second time slot which precedes said first time slot by a chosen number of said time slots, a third pointer associated with said list for indicating a third and oldest time slot in said list which contains tasks to be executed, and a fourth pointer associated with said list for indicating a fourth time slot in said list between said first and second time slots which contains a number of tasks to be executed which is less than said given number of processing entities, said first pointer means providing a time period for the execution of said tasks whose maximum duration is equal to said chosen number of time slots;

second pointer means associated with said queue comprising, a first queue pointer for indicating the next location in said queue wherefrom a task is to be assigned to one of said processors for execution, and a second queue pointer for indicating the location in said queue wherein there has most recently been entered a task for execution.

7. A time-sharing arrangement in a multi-processing system which includes a given number of processors assigned to time-sharing comprising:

means for establishing a queue having the length of said given number of tasks for execution from different jobs presented to said system, said tasks being respectively chronologically entered into said queue;

means for establishing a list of a plurality of chronologically arranged time slots of respectively equal durations; and first pointer means associated with said list, said pointer means comprising, a first pointer associated with said list for indicating a first and current time slot, said first slot containing tasks introduced into said system during said current time slot, a second pointer associated with said list for indicating a second time slot which precedes said first time slot by a chosen number of said time slots, said second time slot containing yet unexecuted tasks introduced into said system at a time not exceeding said chosen number of time slots prior to said current time slot, a third pointer associated with said list for indicating a third and oldest time slot in said list which contains tasks to be executed, and a fourth pointer associated with said list for indicating a fourth time slot in said list between said first and second time slots which contains a number of tasks to be executed which is less than said given number of processors;

said first pointer means providing a time period for the execution of said tasks whose maximum duration is equal to said chosen number of time slots;

means associated with said first pointer means for inserting further tasks destined for said second time slot into said fourth time slot at least until said fourth time slot is filled when it contains a number of tasks equal to said chosen number in response to a number of said tasks and said second time slot equal to said given number of processors, means for causing said fourth pointer to point to a fifth time slot between said fourth and second time slots in response to the filling of said fourth time slot, second pointer means associated with said queue comprising, a first queue pointer for indicating the next location in said queue wherefrom a task is to be assigned to one of said processors for execution, and a second queue pointer for indicating the location in said queue wherein there has most recently been entered a task for execution.

8. A time-sharing arrangement as defined in claim 7 wherein said time slots each comprise registers and wherein said pointers are counters and further including means for simultaneously incrementing said first and second pointers.

9. A time-sharing arrangement as defined in claim 8 wherein said queue comprises registers for denoting tasks, and for containing the addresses of jobs from which the denoted tasks respectively emanate.

References Cited

UNITED STATES PATENTS

| | | | |
|---|---|---|---|
| 3,333,252 | 7/1967 | Shimabukuvo | 340—172.5 |
| 3,346,851 | 10/1967 | Thornton et al. | 340—172.5 |
| 3,421,150 | 1/1969 | Quosig et al. | 340—172.5 |
| 3,461,434 | 8/1969 | Barton et al. | 340—172.5 |

PAUL J. HENON, Primary Examiner

P. R. WOODS, Assistant Examiner